United States Patent [19]

Shamir

[11] Patent Number: 5,369,261
[45] Date of Patent: Nov. 29, 1994

[54] MULTI-COLOR INFORMATION ENCODING SYSTEM

[76] Inventor: Harry Shamir, 20 Shute Path, Newton Centre, Mass. 02159

[21] Appl. No.: 834,666

[22] Filed: Feb. 12, 1992

[51] Int. Cl.⁵ ............................................. G06K 7/12
[52] U.S. Cl. .................................... 235/469; 235/468
[58] Field of Search ................................ 235/468, 469

[56] References Cited

U.S. PATENT DOCUMENTS

| | | | |
|---|---|---|---|
| 3,632,993 | 1/1972 | Acker | 235/469 |
| 3,835,297 | 9/1974 | Inoue | 235/469 |
| 3,836,754 | 9/1974 | Toye | 235/469 |
| 4,023,040 | 5/1977 | Weber | 235/469 |
| 4,488,679 | 12/1984 | Bockholt | 235/469 |
| 4,613,942 | 9/1986 | Chen | 235/469 |
| 4,627,819 | 12/1986 | Burrows | 235/468 |
| 4,795,894 | 1/1989 | Sugimoto | 235/468 |

*Primary Examiner*—Harold Pitts
*Attorney, Agent, or Firm*—Wolf, Greenfield & Sacks

[57] ABSTRACT

An exceptionally dense information encoding system, with 4–10 times the density of CD ROM diskettes, employs colored areas in the form of bars or checkerboard matrices of colored dot regions to encode information including alphanumerics, with each colored region being variable as to both color and intensity. In one embodiment, so-called super pixel dots have differently colored sub-regions within them, arranged with side-by-side colors or with colored regions stacked one on top of the other, such that information from one dot has as many color variables as there are stacked layers or mixed colors. In one embodiment the super pixel dot is 5 microns in diameter with 2 micron spacing between adjacent dots. For each color in one embodiment there are as many as 64 intensities yielding a coding system of high information density. The various colors are read out at one super pixel dot position by dividing out reflected or transmitted energy from a dot by color filtering such that a color and intensity can be detected for each color intensity within the super pixel dot. The code provided by the subject system is substantially invisible to the naked eye, with machine vision and computer analysis of the information being required to effectively decode differences of intensity. Additionally, encrypting can be performed on the digitally encoded information to further hide the information carried by the colored dot matrix. Moreover, standardized intensities are established by one or more of the coded regions to assist in machine decoding, and correction techniques are applied for variations in detected color and intensity.

20 Claims, 17 Drawing Sheets

| HUE | INTENSITIES | | | | | | |
|---|---|---|---|---|---|---|---|
| $A_1$ | $I_1$ | $I_2$ | $I_3$ | • | • | • | $I_K$ |
| $A_2$ | $I_1$ | $I_2$ | $I_3$ | • | • | • | $I_K$ |
| $A_3$ | $I_1$ | $I_2$ | $I_3$ | • | • | • | $I_K$ |
| ⋮ | | | | | | | ⋮ |
| $A_N$ | $I_1$ | $I_2$ | $I_3$ | • | • | • | $I_K$ |

MULTI-COLOR INFORMATION ENCODING SYSTEM

FIELD OF THE INVENTION

This invention relates to an encoding system and more particularly to a system for representing encoded information in terms of a matrix of bar-like or dot-like regions, each encoded by variables of both color and intensity.

BACKGROUND OF THE INVENTION

Traditional black-white bar codes encode at most a couple dozen digits. However, there exists a need for encoding several hundred to several thousand alphanumeric characters to accommodate applications such as the labelling of semiconductor packages or credit card labelling, as well as labelling sight, sound, or software media. Thus in general there is a need for item or package labelling in which large amounts of information can be provided in label form. Note, bar codes are relatively large and, even so, bear very little information. Moreover, bar code labels are commonly read using simple hand held scanners. Thus, bar codes are better when used where very little information is to be conveyed.

There do exist denser information storage matrices utilizing small black/white dots or stripes, such as made by Verotec Inc. of Chatsworth, Calif., or Symbol Technologies Inc. of Bohemia, N.Y., or Intermec Corp. of Lynnwood, Wash. There also exist very dense optical information storage techniques involving CD ROM and holography. However, there is still a requirement for further simplified high density storage as well as a requirement for visual interrogation by simplified optical means.

Colored bar arrays bearing encoded information have been used for many years for instance for color coding of electrical and electronic resistors. In all cases these arrays make use of bars whose colors appear unique to the human eye. No attempt was ever made to create bars using the same color but differing only in intensity as the coding factor to be solely machine read. The basic reason was the unavailability up to the current state of the art of reliable and relatively inexpensive mechanisms such as solid state cameras, computers, software programs, and Application Specific Integrated Circuits to create low-cost readers that could discern and discriminate intensities as well as colors.

By way of background, U.S. Patents illustrating black and white and colored bar codes include U.S. Pat. Nos. 3,772,200, 3,858,506, 3,861,886, 4,010,355, 4,044,227, 4,053,433 4,239,261, 4,329,393, 4,390,452, 4,794,238, 4,268,179, 5,003,251, 4,855,909, 4,844,509, 4,714,934.

As will be appreciated, none of these systems are sufficiently information dense to provide for instance as much as 3000 Mbytes of information within a small labelling area.

Applications for such an information-dense labelling system can be found potentially in most every aspect of the marketplace. The inexorable trend to computerization in all activities leads inescapably to the necessity for information-dense labels and other information storage media. Simply put, for certain applications there is a necessity for the encoding and optional encryption of all relevant information pertaining to the product, which information follows the product for the life of the product.

As an example of the use of small information dense microlabels, these labels may be affixed to a component part in a machine, where the microlabel provides not only an ID number, but sufficient information to reconstruct the manufacturing drawing, the quality of the component as inspected prior to labelling, notes of importance to field service, maintenance information and information regarding final disposal. As can be seen, an appropriate microlabelling system can decrease machine downtime due to faulty components by solving the all too frequent inability to identify the proper component or find a replacement even if it must be made from scratch.

A second example for the use of such a microlabel is the so-called SmartCard, which requires basic machine readable information that is not alterable such as account numbers, ownership information, identification information, basic credit line, issuer, contract and communication data. Moreover, it is essential that the information be secure and unalterable. What is needed is WORM (Write Once Read Many Times) technology. In this regard, magnetic strips or other alterable Random Access Memory type devices are not acceptable because of alterability.

A third example for the use of information dense microlabels is to defeat sales of counterfeit and pirated sight and/or sound recordings, and data media. In this application each CD, tape, record, film, diskette, or any media item receives a unique microlabel, with each label printed independently for each item, and bearing encoded information which uniquely identifies the product in great detail. Even if hundreds of thousands of copies are published of a specific item, each copy is made to bear a uniquely different code, thus impeding the counterfeiting by simple methods.

SUMMARY OF INVENTION

In order to solve the problem of providing an exceptionally information dense label, up to 4–10 times as dense as the information on CD ROM diskettes, the subject system provides color coded dots, bars, or regions arranged to form super pixels in which each super pixel is defined by a series of minute areas, each having a distinct color within or outside the visible spectrum, with each minute area having a predetermined intensity or shade of color much like conventional shades of grey.

Thus, the subject system involves providing coded regions, with each region's code being variable as to both color and intensity. These regions are scanned and read out as to color and intensity of each colored region or sub-region within a super pixel through a suitable algorithm which enables reading of the information, such that designated data is made available only to an authorized entity or individual.

Specifically, a super dense information encoding system with 4–10 times the density of CD ROM diskettes employs a checkerboard matrix of colored dots or regions to encode information such as alphanumerics, with each colored region being variable as to both color and intensity. In one embodiment, super pixel dots consisting of differently colored regions or sub-regions are either arranged with side-by-side colors i.e. sub-regions, or have colored regions stacked one on top of the other, with the viewer seeing the colors as being mixed at the given location which defines the super pixel. Thus information from this super pixel has as many color variables as there are stacked layers or mixed colors. In one embodiment the super pixel dot is 5 microns in diameter, with 2 micron inter-dot spacing. For each color in one embodiment there are as many as 32 or even 64 intensities yielding a coding system of high information density. If stacked layers of colored matter or colorants are used to create the super pixel, the stacked layers are read out at one position, i.e. at one super pixel dot, by dividing out reflected or transmitted energy from a layer by color filtering such that a color and intensity can be detected for each layer. Due to the inability of the human eye to visually decode differences of intensity and see any color outside the visible spectrum, machine vision and computer analysis of the information is necessary. Additionally, encrypting can be performed on the digitally coded alphanumerics prior to the transformation of this digitally encoded information into color and intensity information, to further hide the information. In terms of readout, standardized intensities for each color or each set of stacked or layered or mixed colors can be established by one or more of the coded areas to assist in machine decoding.

As an example, a label no more than ½ inch square can be placed on an encapsulated semiconductor chip in which the label contains the serial number or ID, the company and its address and telephone number, the model number, place of manufacture, test data, application notes, schematic diagram, specification, optimal characteristics of off chip parts, price, marketing information including entire journal articles, customs data, and EPA disposal data. This is possible because a 3 color, 32 intensity super pixel dot can provide 2 alphanumeric ASCII characters per dot. For a 100 character address, telephone number and 7 digit ID number, one needs only approximately 49 super pixels occupying a space of only 45×45 microns or about the diameter of a human hair. Note, different coding schemes can increase the quantity of information conveyed by each colored dot by orders of magnitude.

The subject system includes the label, a reader, a writer, and the algorithms used to encode, encrypt, write, read, decipher and transform the information to end user usable forms.

The writer is an apparatus appropriate to the method chosen to store the information. For instance, if the method chosen is colored ink, the apparatus is an ink printer. If the method chosen is photographic, the apparatus is essentially an image creator and a camera, and a film developer. If the method chosen is layer lay-ups of colored plastic films, the apparatus is a material converter and slitter which create miniature color barcodes. For purposes of discussion, the subject system will be described in connection with a photographic system, although no limitation to photography is intended thereby.

As will be appreciated, the reader captures the encoded image, translates the image into computer processable data, and issues information of interest to the person or machine requesting the information. In the present example CCD type solid state color cameras are discussed as being key elements of at least one type of reader.

As is conventional in photography, the subject microlabels are constructed in one embodiment of a base film, image layers, a protective layer, one or more intermediate bonding layers, and other functional layers such as contact adhesive. If created photographically, the image layer chemistry and physics is basic to the design of the writer.

The essence of the subject labelling system is an array of colored bars or checkerboard array of colors having a variety of intensities. The amount of information storable on such an array is calculable as follows.

Let A or B or C or . . . =colors with a given wavelength bandpass width, I=total detected photon energy or intensity of light of a specific color, whether within or outside the human visible spectrum. It will be clear that the continuum spectrum of visible light and proximate wavelength ranges can be subdivided into contiguous color bands A, B, C, D, E . . . from the UV to the IR, each having a predetermined bandwidth. As used herein, the word "color" is synonymous with "wavelength".

Arbitrarily using a set of wavelengths comprised only of every fourth color, deleting the colors inbetween, and establishing this as set $A_n$, where n=1, 2, . . . N, each color $A_n$ can be recorded in a variety of intensities $I_k$. The result is a matrix $A_n \times I_k$.

The number of combinations of one member of all rows, is $k^n$. One can incorporate on one spot n different colors, each having one intensity from the available population of k intensities.

This is accomplished as follows. Each of the colored areas of the code is provided by recording colors and intensities such that each color and intensity of a colored area designates an element or elements of information.

For instance, if the reader is chosen to be a standard consumer color camera having 3 CCDs, one obtains n=3. Some of these cameras will distinguish 256 intensities or shades of color for each color, but in the present example the number of shades of color are restricted to k=64, which set may include '0', that is, absence of signal. This means that between adjacent used intensities, one leaves three contiguous unused intensity levels for error reduction margin.

The sensor elements involved include solid state arrays or equivalent active elements, appropriate optical devices such as lenses and filters and diffractors, each suitable for the frequency of the electromagnetic signal being processed.

For n=3 and k=64, one calculates $k^n=64^3=262144$ available combinations of 3 colors at a time. This is in essence a three 'digit' numeric element of the set of numbers of base 64, giving 18 independent 'bit' values, as shown below.

To reduce this number to more familiar terms, this means one can have each spot in the code represent a 5 digit base 10 number out of 262144 possible combinations, or a 3 letter (out of 26 letters in the English alphabet) combination out of the possible 262144, or an 18 member base 2 number out of the possible 262144.

Thus, an array of 20×20=400 coded areas, dots, or super pixels can represent a string of 2164 base 10 numerals (0 through 9), out of an available population of $(262144)^{400}=2.606 \times 10^{2164}$ if the order is important as it is in language and other information. If the order is not important, the population is a mere $262144 \times 400=1.048 \times 10^8$. Of the available string of 2164 numerals, some will be allocated to reference and error checking and other internal data management purposes. For a 20×20 dot matrix, the number of usable numerals is thus approximately 1400.

For n=10 colors, k=64 intensity levels and a colored dot size of 3 microns ×3 microns the information storage this represents is over 20 times the storage density of a CD ROM disk at 120 mm OD, 30 mm ID, storing 400 Mbytes.

Where storage on one plane or sheet of a much larger number of super pixel regions is entertained, a scanning device may become part of the system, whether such a scanning device is a series of guided mirrors such as made by the General Scanning Co. of Watertown, Mass., or what is commonly referred in the art as X-Y tables that move either the reader or the sheet bearing the super pixels or any other method. Alternatively the arrays may be imprinted on a tape-like product, and a stationary reading unit may read the coded dots on the tape, much like any traditional tape recording/reading machine, for serial recording and retrieving of information. For Random Access Memory recording and retrieving, other mechanisms are possible.

In summary, in the subject system a colored dot or checkerboard or line matrix of colored regions is utilized to encode alphanumeric and/or other information by virtue of each colored space being variable as to both color and intensity. In one embodiment, in any given region or dot commonly referred in the art as a 'super pixel', numerous different color elements are stacked on top of the other and/or mixed adjacently at the given location, such that information from this one region can have as many color variables as there are elements. The elements in this region are read out at this one position by dividing out light energy from the elements by color filtering or by selective illumination such that a color and intensity can be detected for each group of same elements. The colored checkerboard or line array system can be utilized for labelling of semiconductor or electronic parts, and can be used for mass information storage such as streaming tape applications, for encoding of sight and sound as common in the entertainment industry, for labelling of machine parts, for labelling of sight/sound and/or analog/digital storage media, and for the coding of paper currency, documents and images as well as credit card labelling. Moreover drivers' licenses, pharmaceuticals, medical information cards, jewelry labelling, and packaging labelling in general is within the scope of this invention, as well as any other or may be found in the future. Information confidentiality can be further preserved by encrypting. Further, a special is decoding algorithm is presented and standardized colors and intensities can be established by one or more of the coded areas in color and intensity reference schemes internal to the array.

Note, in selecting the colors, the set of wavelengths and bandpasses constituting the colors are selected to provide a wide margin around each wavelength for prevention of error.

BRIEF DESCRIPTION OF THE DRAWINGS

These and other features of the subject invention will be better understood in conjunction with the Detailed Description taken in conjunction with the Drawings of which:

FIG. 9a is a block diagram illustrating a reading system for labels recorded as illustrated in FIG. 8a;

FIG. 10b is a flow chart for the operation of the reference dot and code generators of FIG. 10a.

FIG. 11b and 11c are flow charts for the operation of the decoding and correction units of FIG. 11a;

DETAILED DESCRIPTION

Figure 1:
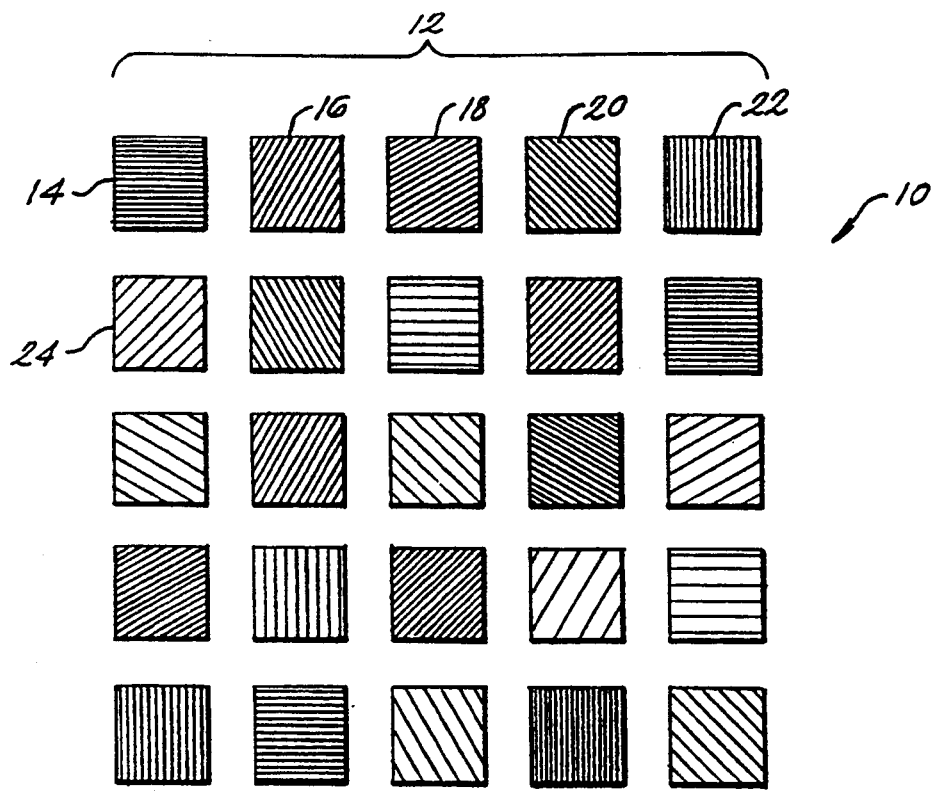
FIG. 1 is a diagrammatic representation of a colored code matrix or array illustrating regions of differing color corresponding to encoded information.

Referring now to FIG. 1, a matrix or array 10 of colored regions 12 includes areas 14 which are provided both with a predetermined color and with a predetermined intensity such that when interrogated the light from these regions is detectable both as to color and as to intensity.

Each of these regions can be referred to as a super pixel in which each super pixel bears a certain amount of information which is encoded with variables, namely, colors and intensities. As can be seen from the shading of the various regions, each of the regions is given a number of different colors such as shown at 16, 18, 20, and 22 across the top row.

Figure 2:
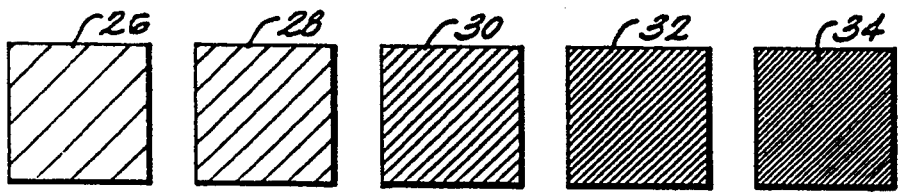
FIG. 2 is a diagrammatic representation of varying intensities for a given color for a region of FIG. 1.

As illustrated in FIG. 2, each color 24 may be provided with a predetermined intensity or amplitude such as illustrated by increasing intensity starting at reference character 26 and going as illustrated to maximal intensity as illustrated at reference character 34.

Figure 3:
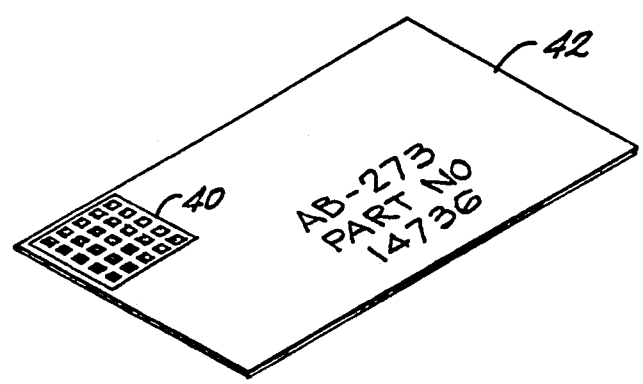
FIG. 3 is a diagrammatic representation of a color encoded label on an article in which the label bears information dense encoded information.

Thus for each region or super pixel, there is a possibility of providing it with one or more of corresponding N colors, each at one of K intensities with the super pixels or regions being 2 microns by 2 microns in one embodiment. As can be seen, the subject matrix can provide exceptional information density, with the matrix being applied in one embodiment to a label which can occupy only several millimeters by several millimeters on a part as illustrated in FIG. 3. Here a microlabel 40 is shown applied to the top surface of a part 42 so that whatever information is required for the particular part, this information can be encoded into the matrix and read out as will be discussed hereinbelow.

The present discussion concerns itself with super pixels. The notion of super pixels is one in which in one embodiment a number of layers of colors are applied one over the other at a single region such that the pigments, dyes, or whatever color bearing materials are used are interrogatable by transmitted or reflected light from the various layers, which light is very little attenuated if at all by overlying layers. As will be discussed, another way of manufacturing super pixels is to provide closely adjacent smaller regions of color which may in fact be contiguous one to the other within the particular region in question. It is thus possible to provide a functionally single region with multiple colors whether the colors are stacked one on top of the other in a layered configuration such as is the case with conventional color photographic film, or are placed side by side in a matrix of smaller dots, such as is common in a color CRT, bearing red, green, and blue dots in close adjacency.

Figure 4A:
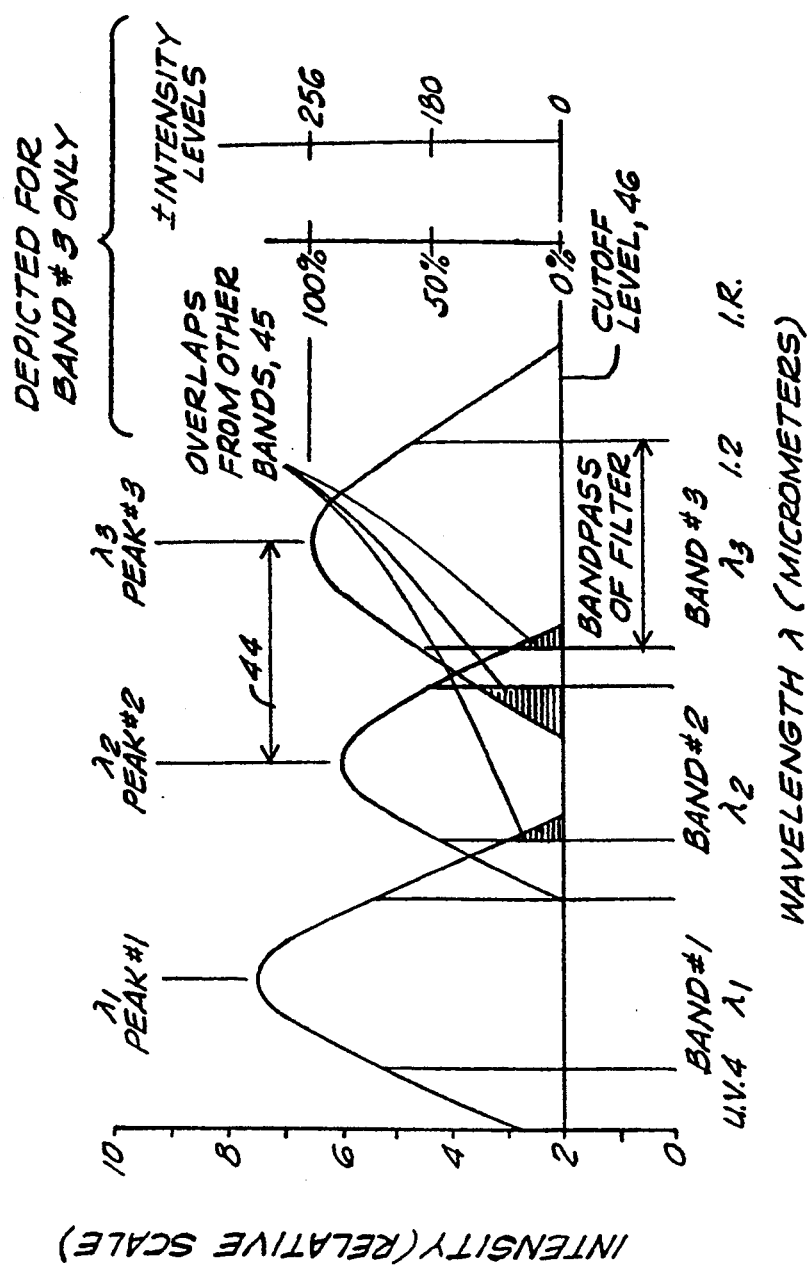
FIG. 4a is a graph showing color band separation intensity levels.

The use of microlabels has been discussed for a variety of information dense applications. For the sake of simplicity, it is important in the selection of the colors for the various regions that the frequency spacing between adjacent filtered colors, as illustrated in FIG. 4a by arrow 44 be sufficient to prevent cross talk between adjacent colors. The bandwidth or bandpass of the individual color or filter can be quite narrow and in one embodiment be plus or minus 4 nanometers, with the spacing in terms of wavelength being relatively large, namely 75 or 100 nanometers, thus to select colors which are relatively far removed one from the other.

However, should such filtering be either impractical or insufficient the text of this patent teaches a mathematical method to prevent final signal incorrectness from wavelength overlaps, as on corners 45. Additionally, cutoff 46 ensures that not too much of the 'skirt' of each colorant becomes part of the processed signal. The vertical axis of the diagram shows that each wavelength has different amplitudes when carrying encoded information. The amplitude ranges between 0 percent to 100 percent for each bandpass, the latter being the intensity saturation level of the colorant material physically present on a colored region or super pixel at that particular waveband.

In parallel is shown a vertical axis translating the intensity into 256 discrete levels, though more are feasible. In another portion of the text of this invention is described the arbitrary limitation of intensity levels to 32 or 64 or other as the case may be. In a colored region or super pixel, there will of course be one or more such wavebands existing congruently.

Figures 5, 6:
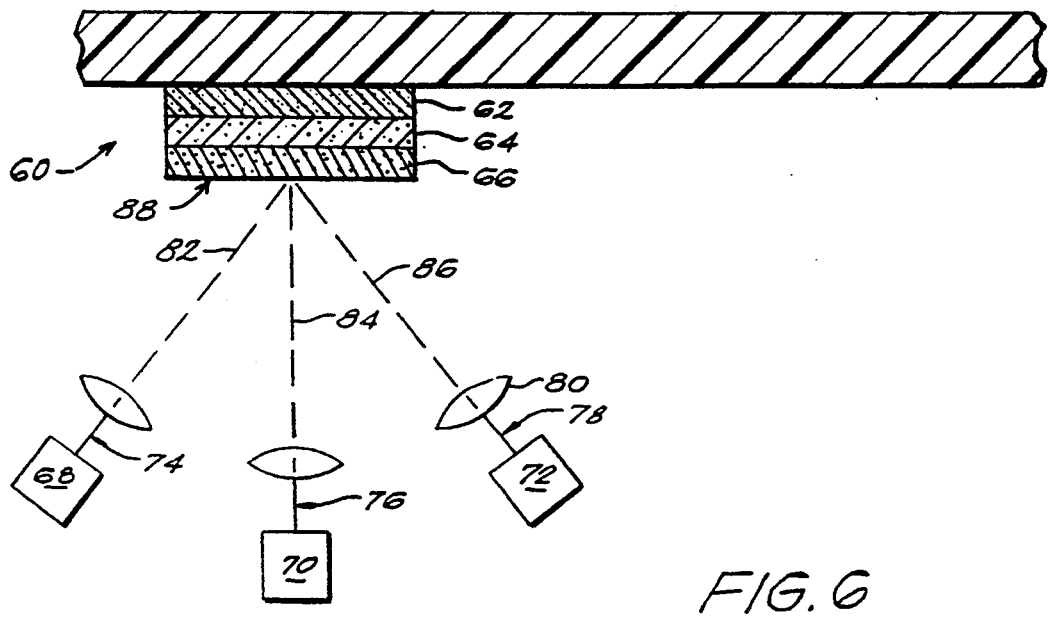
FIG. 5 is a matrix showing colors vs. intensities for possible informational bits for a pixel.
FIG. 6 is a diagrammatic representation of a three layer super pixel showing printing thereof.

Referring to FIG. 5, each color is designated by the capital letter A with a subscript, whereas the intensities are described by the capital letter I with its subscripts. It can be seen that for a given region or pixel having $A_n$ color possibilities, each with $I_k$ intensity possibilities, normally including zero, it is possible for a given region to have large information content. For example, for k=64 and n=3, each region or dot can encode an 18 member base 2 number out of 262144 possible combinations. This is over 2 bytes per region. As described hereinabove, calculations indicate that in the almost optimal case, for 3 micron ×3 micron regions of color, spaced apart by 2 microns, for a 40 by 40 array, there can be over 3,200 bytes of information stored in the matrix. This is over 80,000 bytes per square mm.

Referring to FIG. 6, one way in which a given super pixel region, here illustrated by reference character 60 as being comprised of colored layers 62, 64, and 66, can be encoded, involves the utilization of a writer wherein patterned light sources 68, 70, and 72 have their beams 74, 76, and 78 focused by an optical apparatus, such as a lens 80 producing differently colored radiation beams here illustrated at 82, 84, and 86 so that they impinge upon the top surface 88 of super pixel 60. Depending on the light and intensity content of the beam, each of layers 62, 64, and 66 will be appropriately exposed as is conventional with color film.

Figure 7:
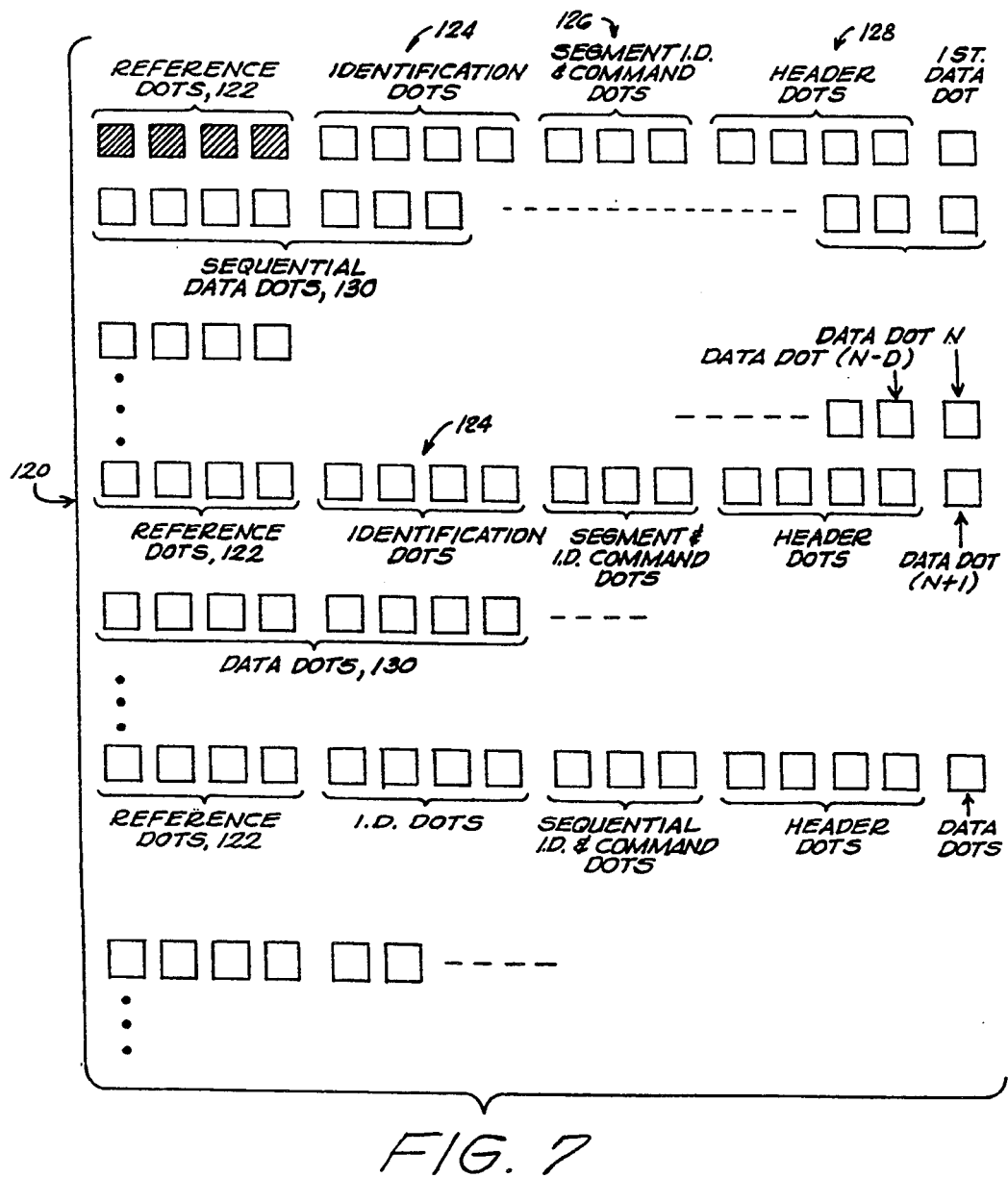
FIG. 7 is a diagrammatic representation of a portion of a color coded label showing reference dots and encoded information dots.

Referring now to FIG. 7, an embodiment of a microlabel 120 is provided with a series of reference dots 122, identification dots 124, and segment identification and command dots 126, header dots 128, and encoded information dots 130. The reference dots 122 and identification dots 124 are replicated within the microlabel 120. The replication serves as a backup of information in the event that part of a segment or a total segment of dots is corrupted, thus the backup enables maximum retention capability of the encoded information dots 130 that are processed by the reader. The purpose of the reference dots 122 is to provide standardized colors and standardized intensities that will be utilized by the reader and associated signal processing to perform calibration procedures prior to the decoding of information dots 130. The identification dots 124 contain information pertinent to the protocol of the microlabel 120. The segment identification and command dots 126 identify the characteristic of the encoded information dots 130 that are recorded in that block of data, thus the microlabel 120 can be read in a particular block that contains the relevant information desired. The header dots 128 contain housekeeping information and segment specific coding information. The encoded information dots 130 are in the embodiment sequentially arranged to contain the data, however, any arrangement of the information dots is feasible if such is the desired protocol. The scrambling of information dots 130 adds an additional encryption measure to the microlabel 120. The descrambling of the encoded information dots 130 is conveyed by the segment identification and command dots 126. Numerous microlabel 120 formats are realizable to one skilled in the art.

IMPLEMENTATION

One algorithm for generating both color and reference dots is given below:

```
#include <stdlib.h>
#include <stdio.h>
include <math.h> int igCurrBlock = 1;
int igCurrColor = 1;
char sColorNames[3][10] = { "Red", "Green", "Blue" };
#define BITS_PER_CHAR 7
#define MAX_ALLOWED_BITS_COLOR 14
```

```c
FILE *gfilepIn, *gfilepOut;
int igNumColors, igNumLevels, igColWidth;
int igTotalBlocks = 0;
int igTotalRows = 0;

#define UPPER_LEFT    1
#define UPPER_RIGHT   2
#define LOWER_LEFT    3
define LOWER_RIGHT   4 int output_color (int iInten);
int output_ref_block (int iRefType);
int output_big_ref_block ();

main (int argc, char *argv[])
{
   int cIn;
   int iNumBitsPColor, iNumBitsPBlock;
   int iCurrBit = 0, iMaxColVal;
   long ilCurrColorVal = 0, lInFileSize;

if (argc < 6)
   {
      printf
         ("Insufficient arguments\nNum_Colors  Num_Levels  In_File  Out_File Num_Cols\n");
      exit (0);
   }
   igNumColors = max (1, min (atoi (argv[1]), 3));
   igNumLevels = max (2, atoi (argv[2]));
   iNumBitsPColor = (int)((log (igNumLevels) + .00001) / log (2));
   iNumBitsPColor = min (iNumBitsPColor, MAX_ALLOWED_BITS_COLOR);
   iNumBitsPBlock = iNumBitsPColor * igNumColors;
   igColWidth = max (2, atoi (argv[5]));
   iMaxColVal = (int)(pow ((double)(2.0), (double)(iNumBitsPColor)));
   igNumLevels = iMaxColVal;

if ((gfilepIn = fopen (argv[3], "rb")) == NULL)
   {
      printf ("Could not open file '%s'\n", argv[3]);
      exit (0);
   }
   if ((gfilepOut = fopen (argv[4], "w")) == NULL)
   {
      printf ("Could not open file '%s'\n", argv[4]);
      exit (0);
   }
   fseek (gfilepIn, 0L, SEEK_END);
   lInFileSize = ftell (gfilepIn);
   fseek (gfilepIn, 0L, SEEK_SET);
   igTotalBlocks = (((int)(lInFileSize) * BITS_PER_CHAR) + 1)
                   / iNumBitsPBlock;
   igTotalRows = (igTotalBlocks / igColWidth) + 1;

printf ("%d colors, %d levels\nInput file '%s', Output File'%s'\nColumn Width %d\n",
           igNumColors, igNumLevels, argv[3], argv[4], igColWidth);
   printf ("%d bits per Block, %d bits per Color\n", iNumBitsPBlock,
```

```
                iNumBitsPColor);

output_big_ref_block ();
    fprintf (gfilepOut, "%d colors, %d levels, %d Column Width\n",
            igNumColors, igNumLevels, igColWidth);
    fprintf (gfilepOut,
            "%d bits per Block, %d bits per Color\n",
            iNumBitsPBlock, iNumBitsPColor);
    fprintf (gfilepOut, "\nRow 1\nColumn 1, Block 1\n");

while ((cIn = fgetc (gfilepIn)) != EOF)
    {
        if (cIn >= 0x80)
            cIn = cIn - ((cIn / 0X80) * 0X80);

ilCurrColorVal += (long)cIn
                    *       (long)(pow      ((double)(2.0),
(double)(iCurrBit)));

iCurrBit += BITS_PER_CHAR;
        while (iCurrBit >= iNumBitsPColor)
        {
            output_color ((int)(ilCurrColorVal % (long)iMaxColVal));
            ilCurrColorVal /= (long)iMaxColVal;
            iCurrBit -= iNumBitsPColor;
        }
    } while (igCurrColor != 1)
        output_color (0);
    output_ref_block (LOWER_RIGHT);
    fprintf (gfilepOut, "End of list\n");
} int output_color (int iInten)
{
    fprintf (gfilepOut, "\t%s:    %d",
                sColorNames[igCurrColor - 1], iInten + 1);
    if (++igCurrColor > igNumColors)
    {
        igCurrColor = 1;
        fprintf (gfilepOut, "\n");
        if (++igCurrBlock == igColWidth)
            /* output_ref_block (UPPER_RIGHT) */ ;
        if ((igCurrBlock % igColWidth) == 0)
            fprintf     (gfilepOut, "\nRow    %d\n",    (igCurrBlock    /
igColWidth + 1));
        fprintf (gfilepOut, "Column %d, Block %d\n",
                (igCurrBlock % igColWidth) + 1, igCurrBlock);
    }
} int output_ref_block (int iRefType)
{
    int i;
    switch (iRefType)
    {
        case UPPER_LEFT:
        case UPPER_RIGHT:
        case LOWER_LEFT:
        case LOWER_RIGHT:
```

```
    for (i = 0; i < igNumColors; i++)
    {
        output_color (0);
    }
    switch (igNumColors)
    {
        case 1:
            output_color (igNumLevels - 1);
        case 2:
            output_color (igNumLevels - 1);
            output_color (0);

output_color (0);
            output_color (igNumLevels - 1);
        case 3:
            output_color (igNumLevels - 1);
            output_color (0);
            output_color (0);

output_color (0);
            output_color (igNumLevels - 1);
            output_color (0);

output_color (0);
            output_color (0);
            output_color (igNumLevels - 1);
    }
}
} int output_big_ref_block ()
    {
        switch (igNumColors)
        {
            case 1:
                output_color (0);
                output_color (igNumLevels / 2 - 1);
                output_color (igNumLevels - 1);
            case 2:
                output_color (0);
                output_color (0);
                output_color (igNumLevels / 2 - 1);
                output_color (0);
                output_color (igNumLevels - 1);
                output_color (0);
                output_color (0);
                output_color (igNumLevels / 2 - 1);
                output_color (igNumLevels / 2 - 1);
                output_color (igNumLevels / 2 - 1);
                output_color (igNumLevels - 1);
                output_color (igNumLevels / 2 - 1);
                output_color (0);
                output_color (igNumLevels - 1);
                output_color (igNumLevels / 2 - 1);
                output_color (igNumLevels - 1);
                output_color (igNumLevels - 1);
                output_color (igNumLevels - 1);
            case 3:
                output_color (0);
                output_color (0);
                output_color (0);
                output_color (0);
```

```
output_color (0);
output_color (igNumLevels / 2 - 1);
output_color (0);
output_color (0);
output_color (igNumLevels - 1);
output_color (0);
output_color (igNumLevels / 2 - 1);
output_color (0);
output_color (0);
output_color (igNumLevels / 2 - 1);
output_color (igNumLevels / 2 - 1);
output_color (0);
output_color (igNumLevels / 2 - 1);
output_color (igNumLevels - 1);
output_color (0);
output_color (igNumLevels - 1);
output_color (0);
output_color (0);
output_color (igNumLevels - 1);
output_color (igNumLevels / 2 - 1);
output_color (0);
output_color (igNumLevels - 1);
output_color (igNumLevels - 1);
output_color (igNumLevels / 2 - 1);
output_color (0);
output_color (0);
output_color (igNumLevels / 2 - 1);
output_color (0);
output_color (igNumLevels / 2 - 1);
output_color (igNumLevels / 2 - 1);
output_color (0);
output_color (igNumLevels - 1);
output_color (igNumLevels / 2 - 1);
output_color (igNumLevels / 2 - 1);
output_color (0);
output_color (igNumLevels / 2 - 1);
output_color (igNumLevels / 2 - 1);
output_color (igNumLevels / 2 - 1);
output_color (igNumLevels / 2 - 1);
output_color (igNumLevels / 2 - 1);
output_color (igNumLevels - 1);
output_color (igNumLevels / 2 - 1);
output_color (igNumLevels - 1);
output_color (0);
output_color (igNumLevels / 2 - 1);
output_color (igNumLevels - 1);
output_color (igNumLevels / 2 - 1);
output_color (igNumLevels / 2 - 1);
output_color (igNumLevels - 1);
output_color (igNumLevels - 1);
output_color (igNumLevels - 1);
output_color (0);
output_color (0);
output_color (igNumLevels - 1);
output_color (0);
output_color (igNumLevels / 2 - 1);
output_color (igNumLevels - 1);
output_color (0);
output_color (igNumLevels - 1);
output_color (igNumLevels - 1);
output_color (igNumLevels / 2 - 1);
```

```
    output_color (0);
    output_color (igNumLevels - 1);
    output_color (igNumLevels / 2 - 1);
    output_color (igNumLevels / 2 - 1);
    output_color (igNumLevels - 1);
    output_color (igNumLevels / 2 - 1);
    output_color (igNumLevels - 1);
    output_color (igNumLevels - 1);
    output_color (igNumLevels - 1);
    output_color (0);
    output_color (igNumLevels - 1);
    output_color (igNumLevels - 1);
    output_color (igNumLevels / 2 - 1);
    output_color (igNumLevels - 1);
    output_color (igNumLevels - 1);
    output_color (igNumLevels - 1);
```

The color reference dots 122 are at most a few percent of the total number of dots in a label. They may be, but are not limited to, each of the "effective primary colors" for the system. For example, with three colorants, the reference dots may be made of each of the pure colorants successively, placed at known, standardized, locations in the code label for the selection of color reference dots to be representative of typical coded material, particularly of the extremes of color and intensity. Thus, it is often desired to have each of the reference dot colors at various intensities of the primary colors. For example, the reference dots may be mixed with various proportions of black in equal steps. Thus, for example, the reference dots may include 0, 10, 20, . . . percent each of mixed red, green, and blue colorants.

Figure 13:
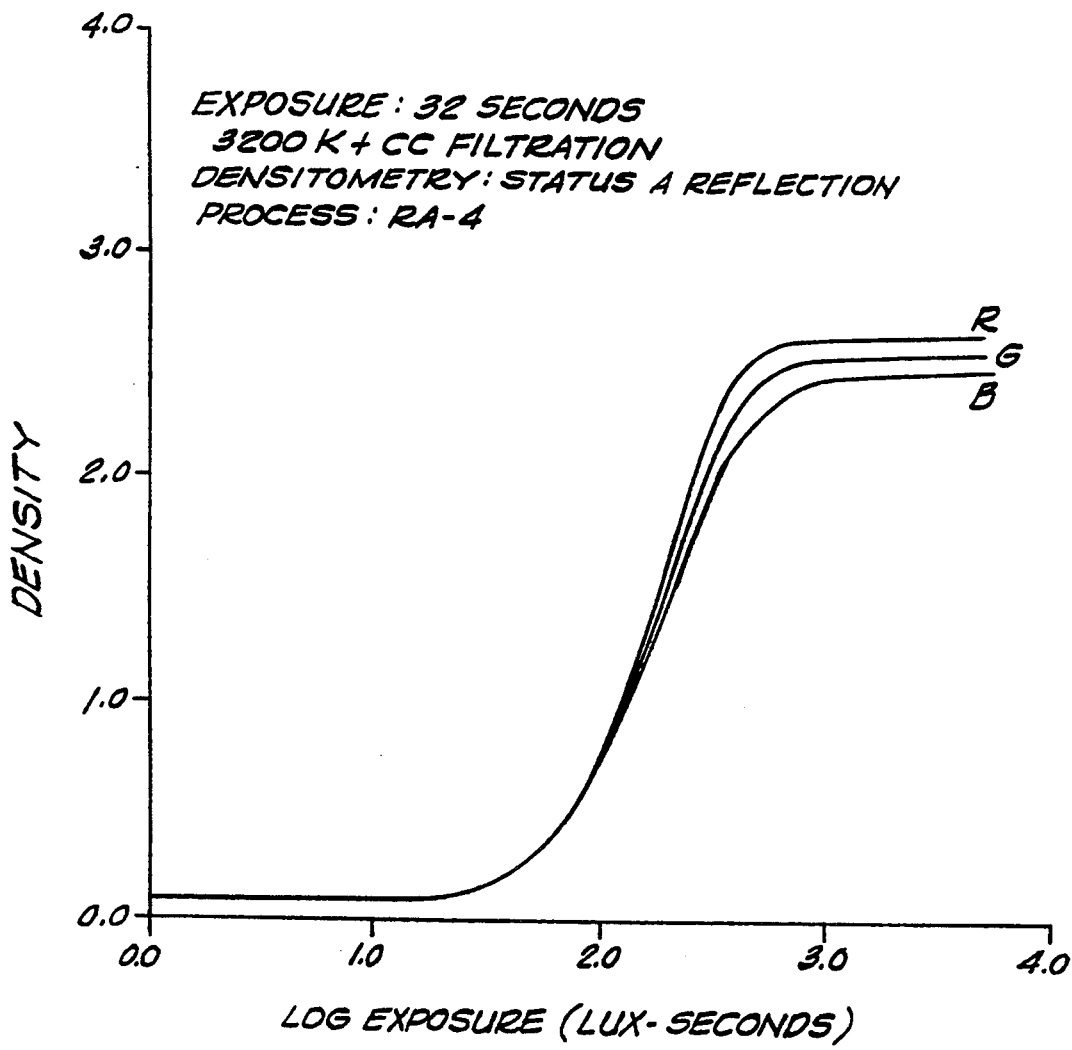

An essential part of the use of reference dots is that when the code label is being read, the colorant composition of each reference dot is known and corresponds to its preset location.

Where a printing medium might have non-linear input/output characteristics such as photographic media as depicted in FIG. 13, the unequal color illumination intensity steps, chosen according to known medium properties, might be desirable in place of equal input steps of intensity.

Figure 8A:
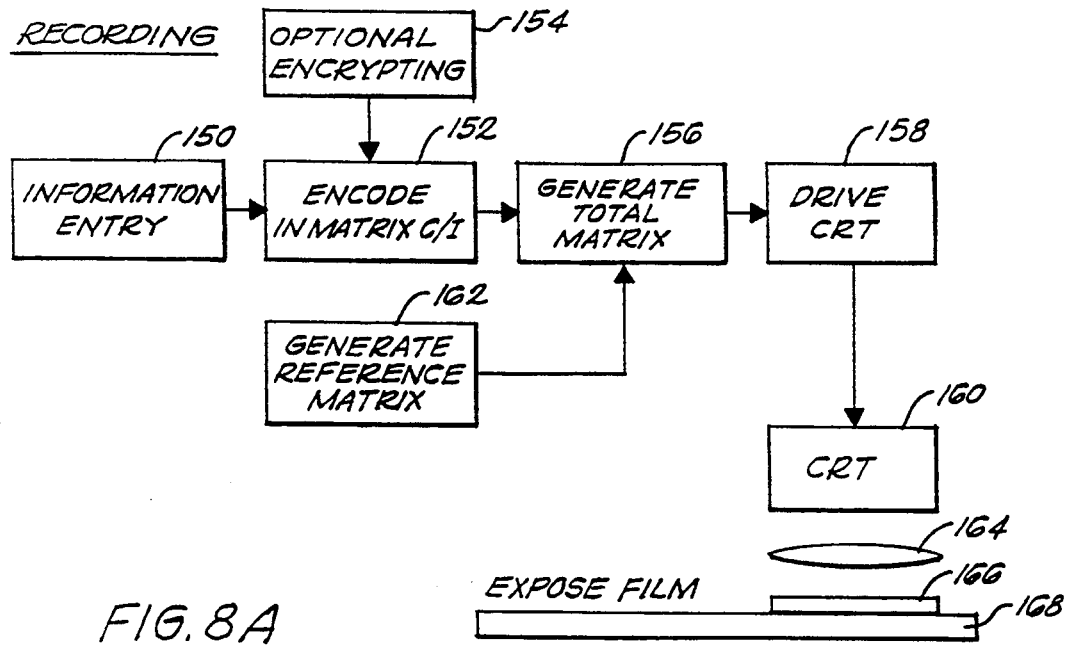
FIG. 8a is a block diagram illustrating an information recording system with optional encrypting.

Another class of reference dots may be used that is totally distinct from the color reference dots. These are part of the coded message, in effect. They include headers of message blocks, checksums and other quantities associated with error detection and correction codes. This class reference information is similar to the use of headers in coding as practiced in the communication field for radio and telephone transmission, also in the encoding of messages for magnetic media storage. Referring now to FIG. 8a, in one embodiment, assuming a film-type colored regions or super pixels system, information entry is provided by a unit 150 coupled to an encode unit or software program 152 which provides that the information be encoded in terms of the variables of color and intensity. Optional encrypting may take place as illustrated at unit or software program 154 to provide that the encoded colors and intensities may in and of themselves be subject to a further algorithm which can only be deciphered upon detection of reflected or transmitted energy as the case may be from the microlabel. The output of the encoder software program or unit is applied to a software program or unit 156 which generates the entire matrix so as to permit coupling of the resultant matrix to a CRT drive unit 158 which drives a CRT 160. Also, a software program or unit 162 which generates the aforementioned reference matrices is coupled to the software program or unit 156 such that the matrix of encoded information thus generated, properly interleaves with the reference matrix thus generated.

The output of the CRT 160 is imaged at 164 on a film 166 which is positioned on a substrate 168 such that the entire relevant portion of the face of the CRT, which may be composed of colored super pixel dots or may be monochromatic with its dots of light at various intensities all modulated sequentially to colored wavebands by means of appropriate light filters (as is the case with the Matrix product made by AGFA Compugraphics of Wilmington, Mass.)is transferred to the film.

Figure 8B:
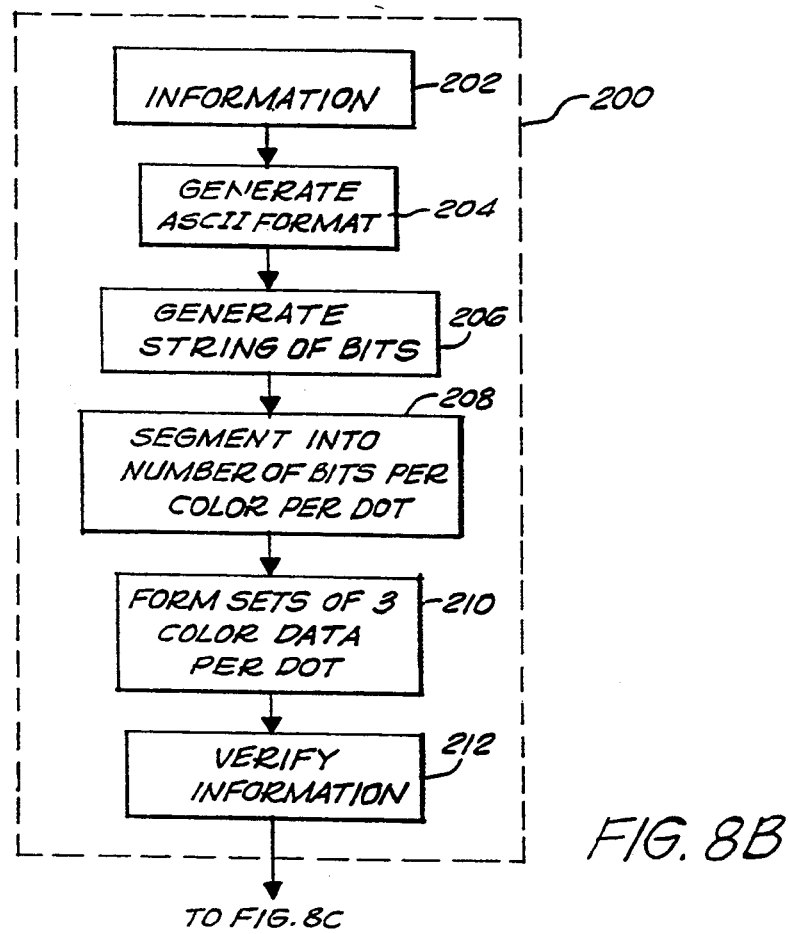
FIG. 8b–8d illustrate one method of recording.
Figure 8C:
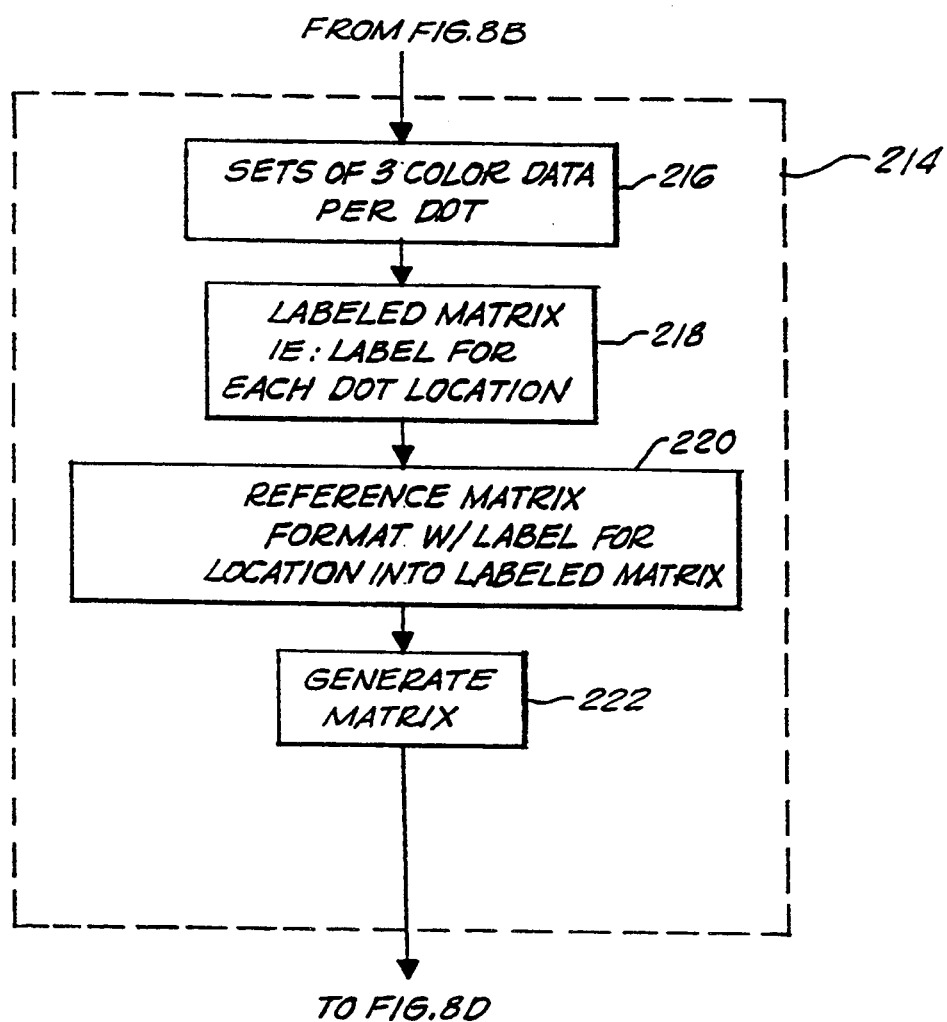
Figure 8D:
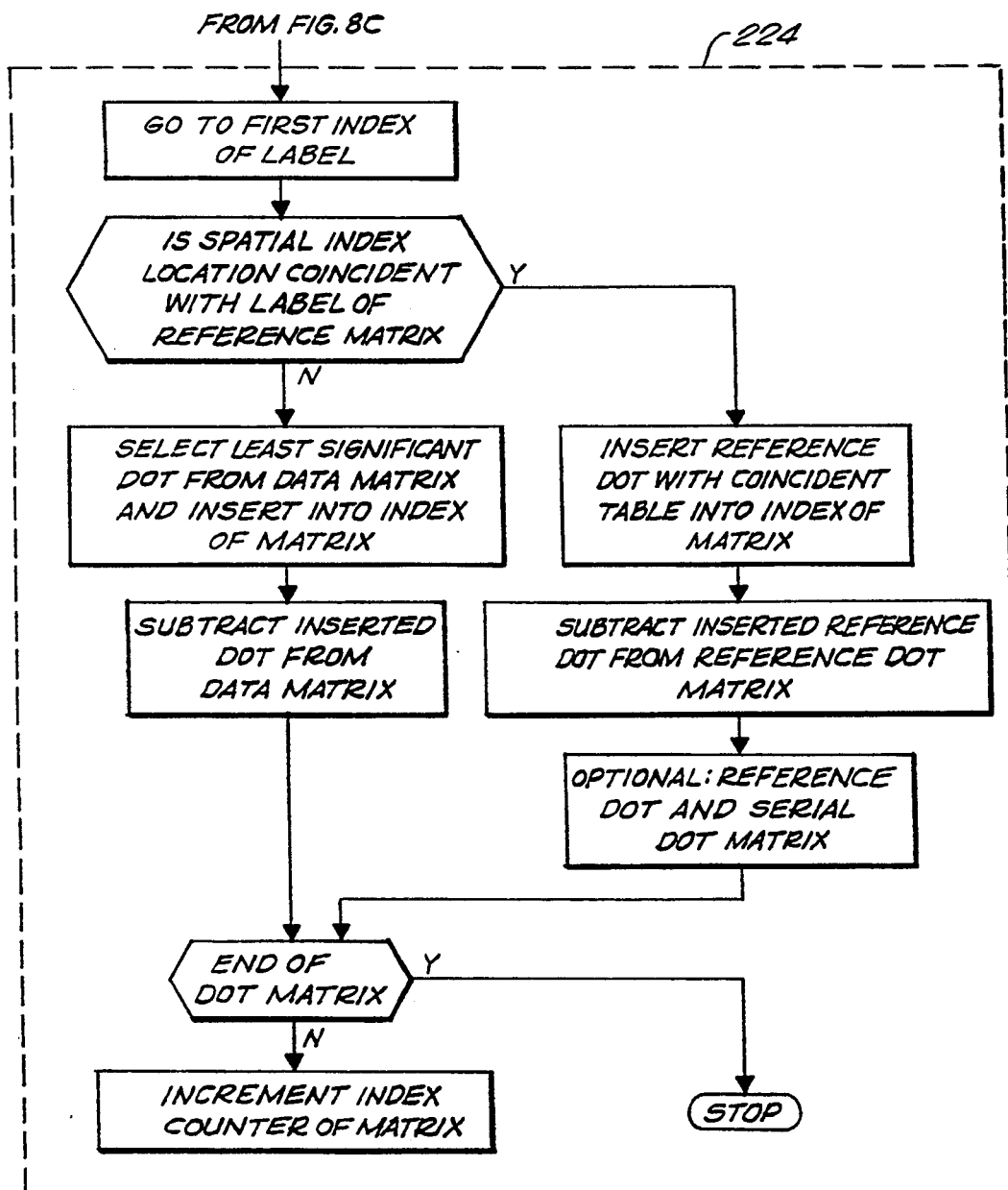

Referring now to FIG. 8b, as shown in dotted box 200, with respect to recording, information 202 is applied to a unit which generates an ASCII format 204 that supplies a string of bits 206 to a unit which segments the bits into numbers of bits per color per dot as illustrated at 208. The output of 208 is provided to a unit 210 which forms sets of three color data blocks per dot, the output of which is provided to a unit 212 which verifies the information. Thereafter as illustrated in FIG. 8C in dotted block 214, a unit 216 is provided to separate out sets of three color data per dot, which thereafter is provided to a unit that labels the matrix in terms of providing a label for each dot location as illustrated at 218. Thereafter the output of this unit is provided to a reference matrix format unit 220 to provide a label for each location to provide a labelled matrix. Thereafter as illustrated at 222, the matrix is generated. Referring now to FIG. 8d, as illustrated by dotted box 224, the algorithm for generating the dots is described by the flow chart therein.

Figure 9A:
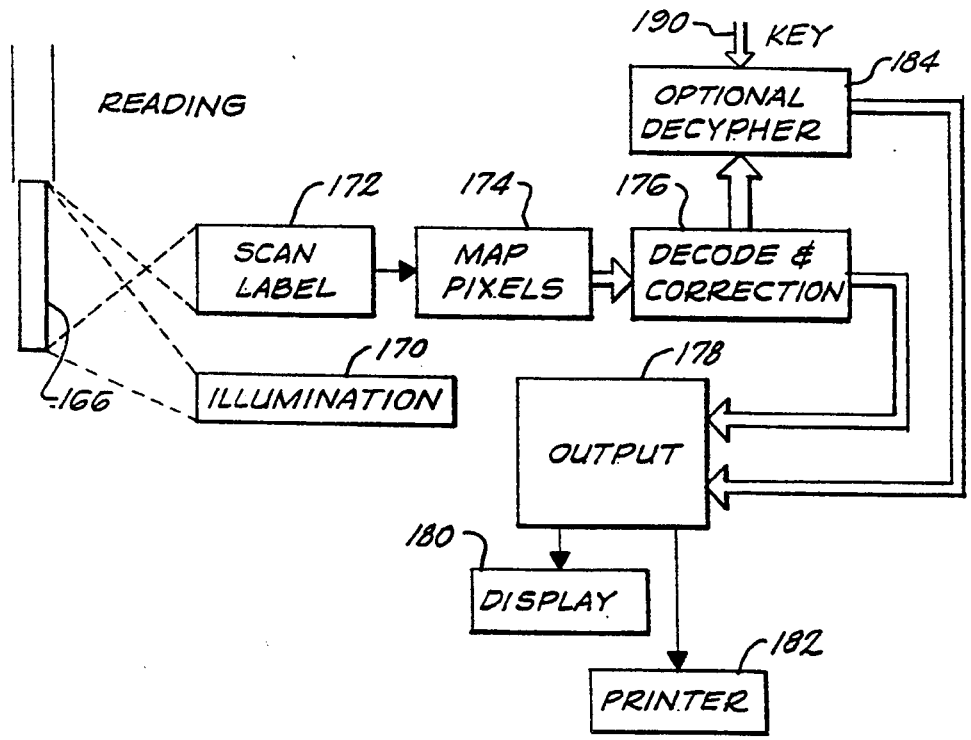

In terms of reading of the film 166 and referring now to FIG. 9a, film 166 is illuminated by a light source 170, with the reflected energy from the label being scanned conventionally at 172. Here the output of the scanning process is coupled to a unit 174, being a software register which records the coordinate map of the pixels and the colors and intensities. Thereafter, after a map has been generated, the map is applied to a decode and correction software program or unit 176 which identifies and corrects the pixels, pixel by pixel, and generates characters which are output at a unit 178 to a display 180 or to a printer 182 such that the encoded information may be read.

An optional deciphering algorithm may be stored in an optional deciphering software program or unit 184, with the output thereof applied to output unit 178 such that the decipher map may be utilized as a mask to provide appropriate deconvolution of the decoded corrected data obtainable from decode and correction unit 176. As is usual, a key 190 may be utilized as the decipher key.

Figure 9B:
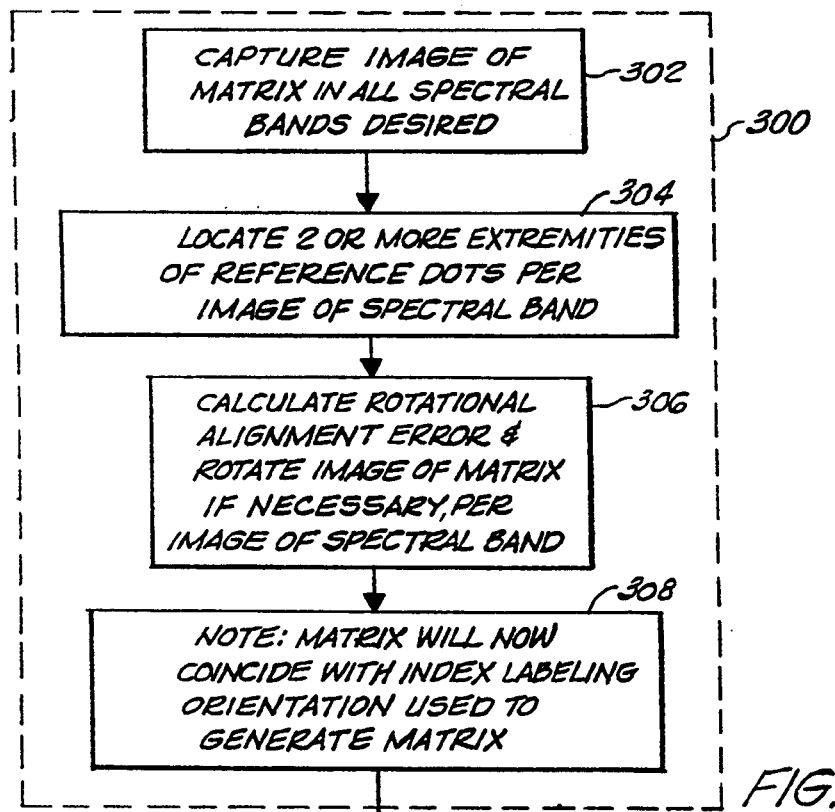
FIG. 9b–9c illustrate one method of reading a color encoded matrix.

More specifically, and referring now to FIG. 9b with reference to dotted box 300, the reading method includes the capturing of the image of the matrix in all spectral bands as illustrated at 302, the output of which is coupled to a unit which locates two or more extremities of the reference dots per image as illustrated at 304, after which a unit calculates rotational alignment error including a rotation of the image of the matrix if necessary with respect to the image of the spectral band as illustrated at 306. As illustrated at 308, the purpose of unit 306 is to require that the detected matrix coincide with index labelling orientation that is used to generate the matrix.

Figure 9C:
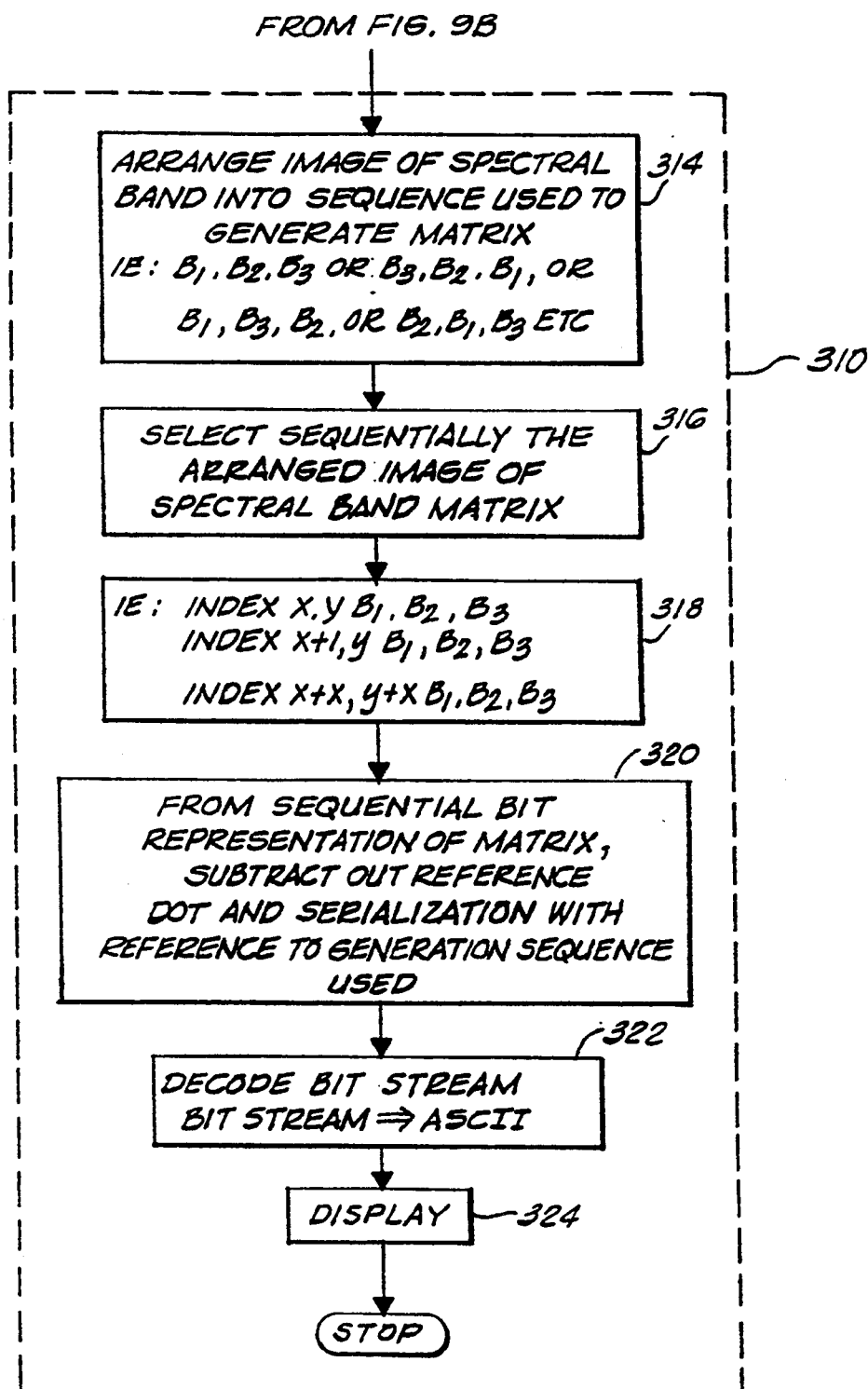

Referring now to FIG. 9c and dotted box 310, the image of the spectral band is arranged into the sequence used to generate the matrix, i.e. $B_1$, $B_2$, $B_3$, or $B_3$, $B_1$, $B_2$, or $B_1$, $B_3$, $B_2$, or $B_2$, $B_1$, $B_3$, etc. as illustrated at 314. Thereafter the arranged image of the spectral band matrix is sequentially selected as illustrated at 316 to yield the indexes illustrated in 318. Thereafter as illustrated at 320, the reference dot is subtracted out from the sequential bit representation of the matrix and serialization is accomplished with reference to the generation sequence used. Thereafter as illustrated at 322, the bit stream is decoded to provide an ASCII format, with the decoded label then displayed as illustrated at 324.

Figure 10A:
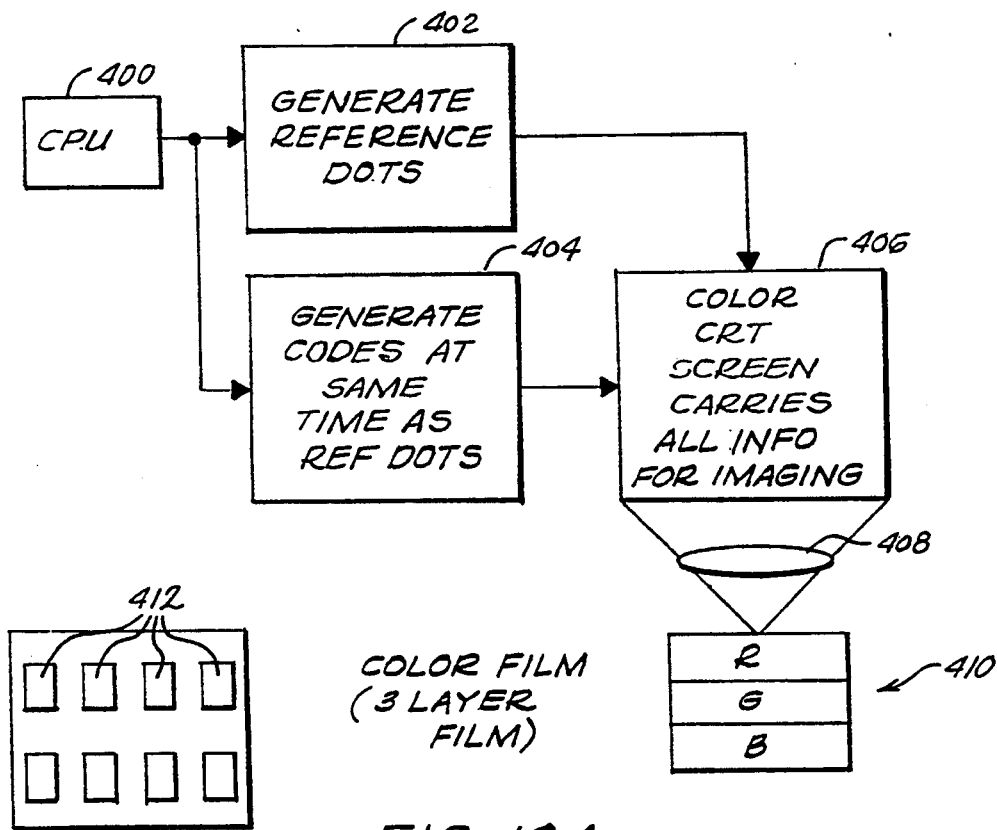
FIG. 10a is a generalized block diagram of a system for simultaneously generating reference dots and code dots to permit accurate decoding of both color and intensity.

Referring to FIG. 10a, in order to generate the reference dots, a CPU 400 is utilized both to generate reference dots as illustrated at software program or unit 402 and to generate codes at the same time as the reference dots are generated as shown by software program or unit 404. The simultaneous generation of the codes as well as the reference dots ensures tracking of intensity and color, since the code and the reference dots are written at the same time.

All encrypting and deciphering operations are carried out on the bit streams which are the machine language version of the information being handled, in accordance with an appropriate encrypting/deciphering algorithm such as ANSI X3.92—1981 AMERICAN NATIONAL STANDARD DATA ENCRYPTION ALGORITHM, approved Dec. 30, 1980 by the American National Standards Institute, Inc.

The outputs of software programs or units 402 and 404 are provided in one embodiment to a color CRT 406, such as the COLORADO Color Imaging Recorder of Metrum Information Storage of Denver, Colo., which displays all of the information for imaging. The surface of the CRT is imaged by optical element 408 onto a red/green/blue photographic film 410, with each of the pixels provided at the surface of the CRT being duplicated on the film as illustrated by pixels 412 to the left of this diagram.

Figure 11A:
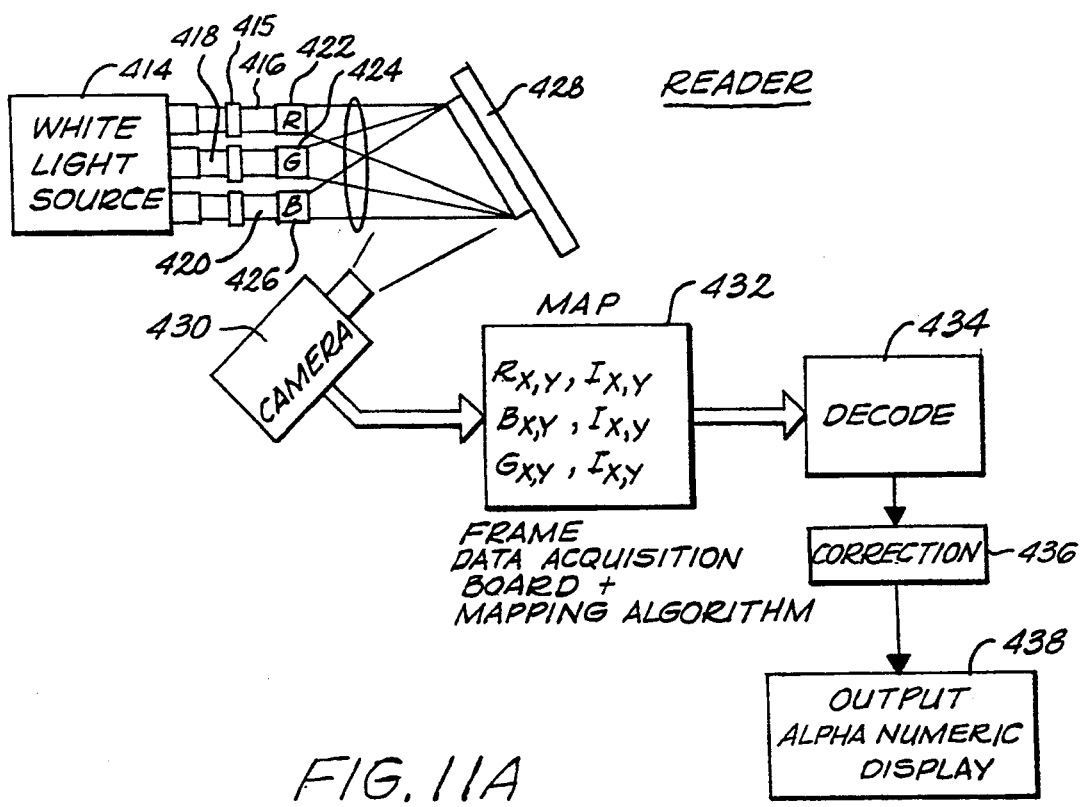
FIG. 11a is a block diagram of a reader using a standard monochrome camera and bit mapping system.
Figure 10B:
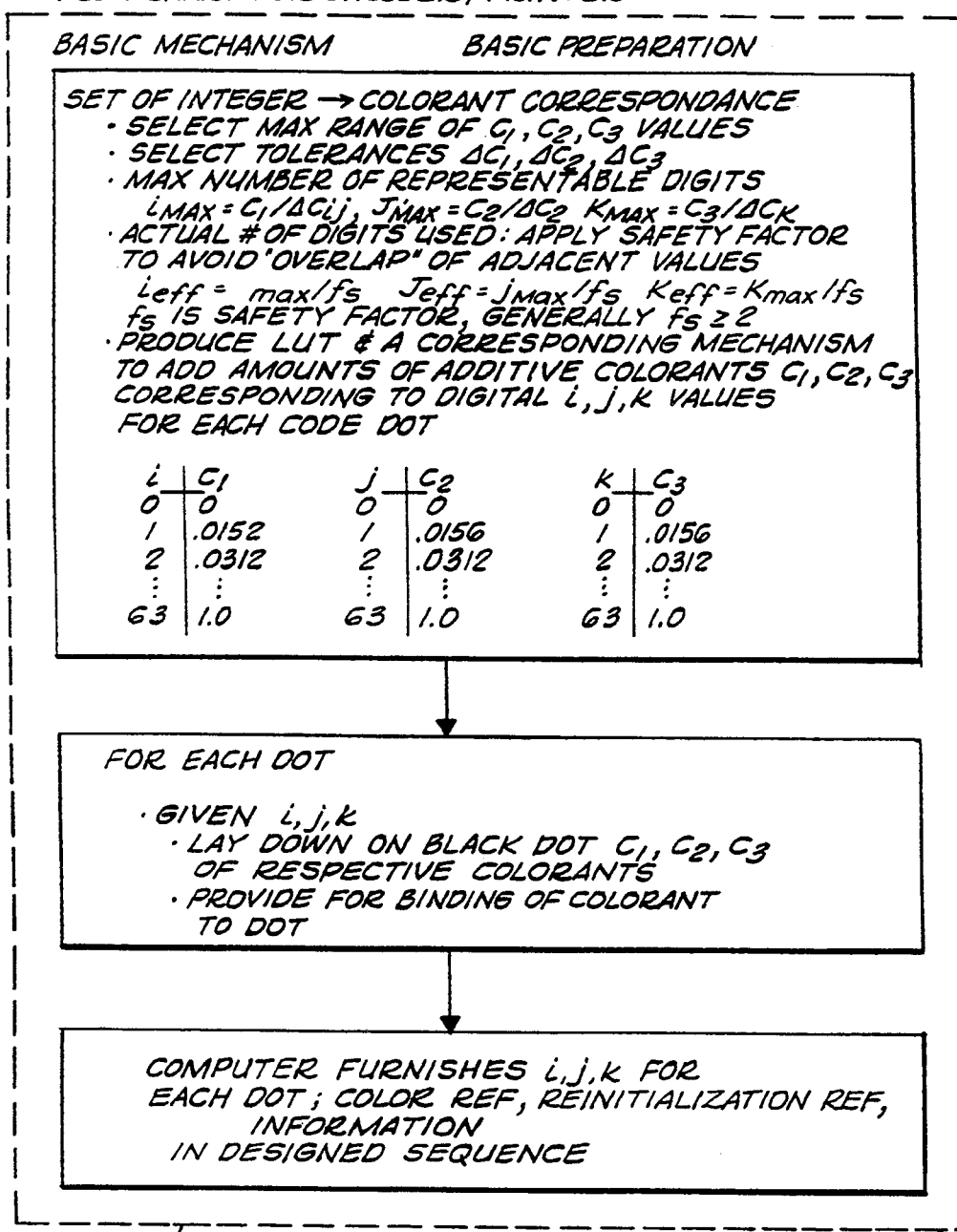
Figure 11B:
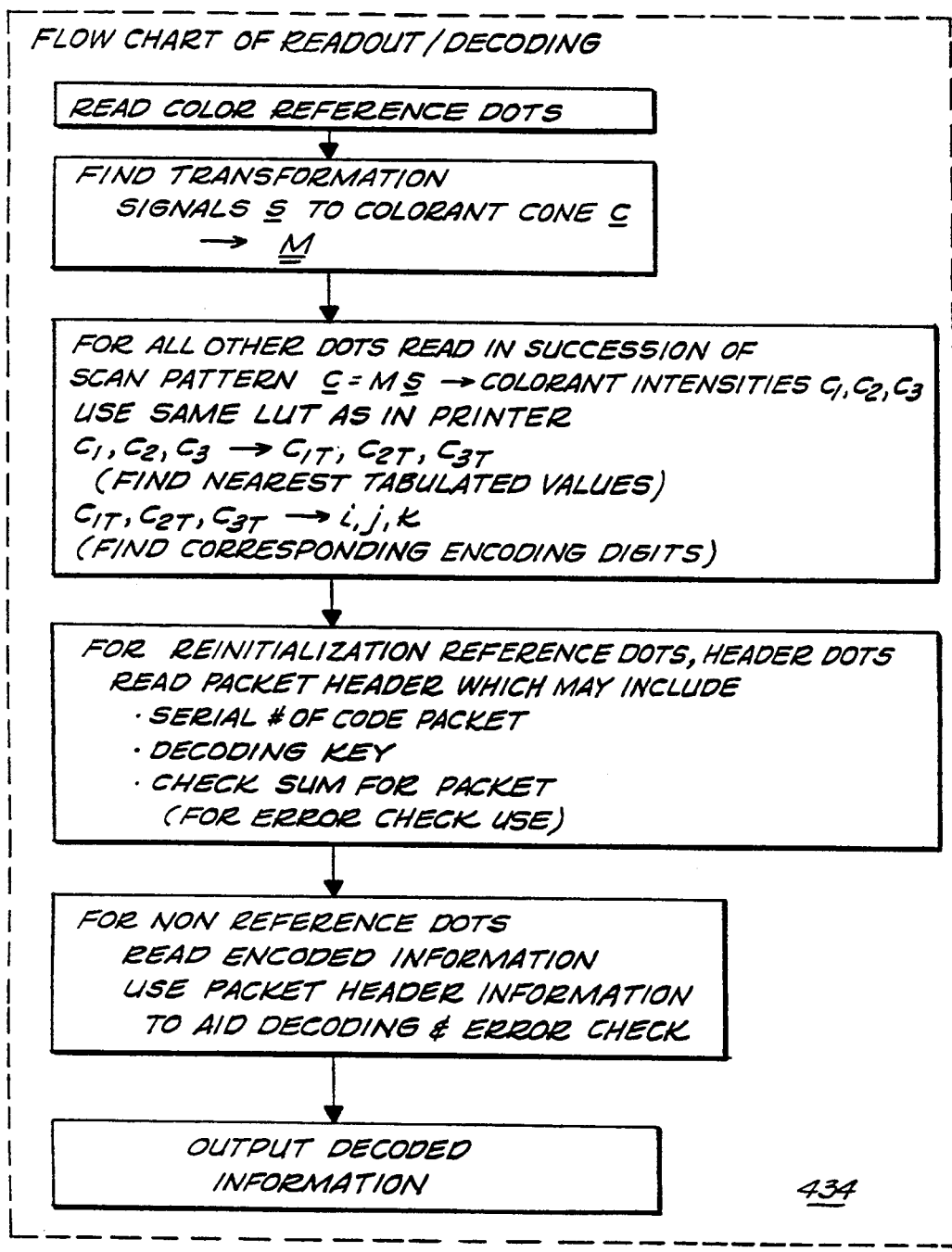
Figure 11C:
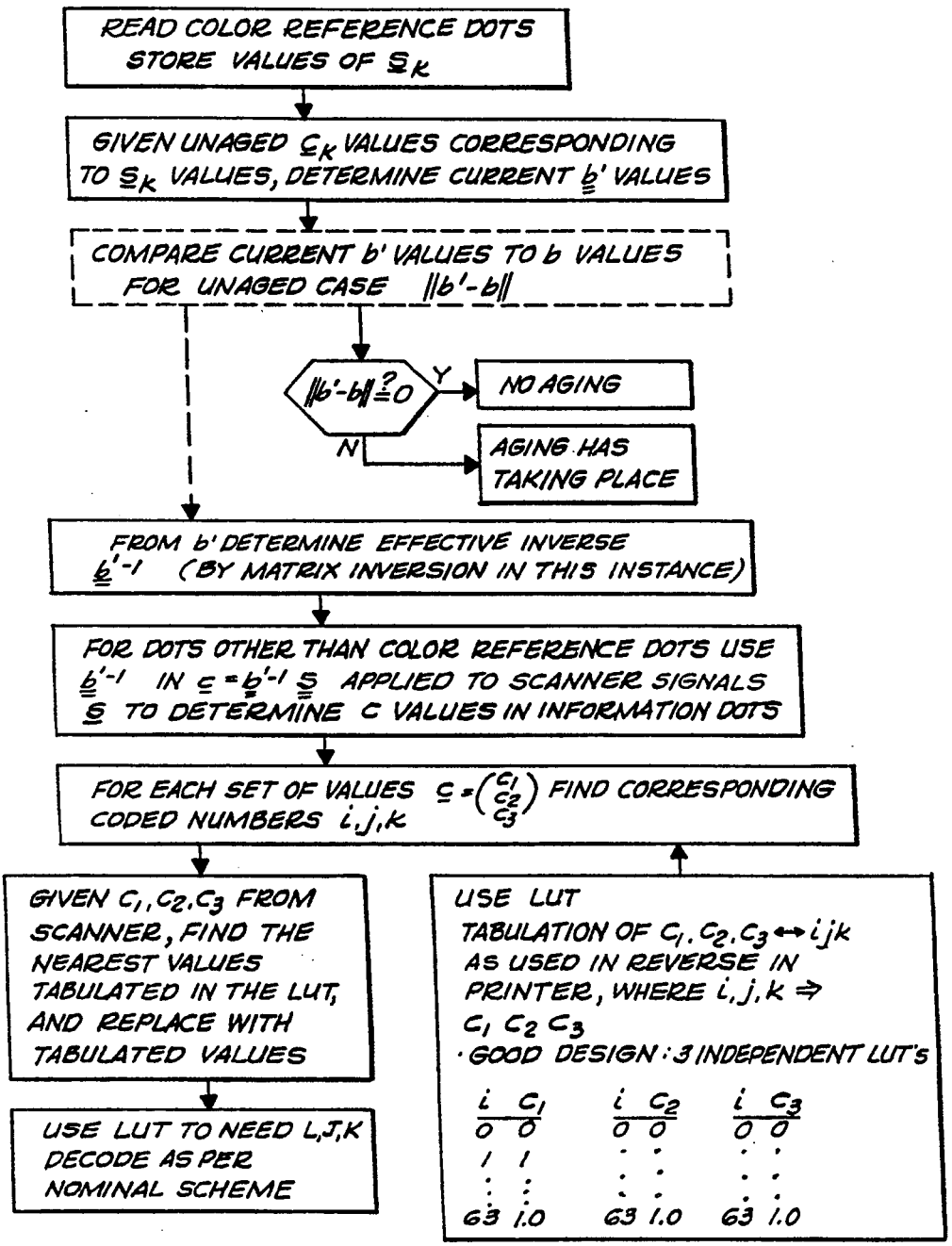

Referring to FIG. 11a, in order to read out such a microlabel using reflected light, a white light source 414 may provide multiple beams 416, 418, and 420 divided as to color via filters 422, 424, and 426, and exposed individually by use of shutters 415 enabling each monochromatic color beam to be shined one at a time across label 428. The result is reflected radiation in the direction of a monochromatic camera 430 having an output which is provided to a mapping software program and/or hardware unit 432 that provides a map in terms of the red/green/blue colors and intensities across the face of the label. The output of this unit is applied to a decode software algorithm unit 434 and thence a correction unit 436 so that the result is an output of the encoded alphanumeric information contained in the code here illustrated at 438. Note that unit 432 is provided with a computer platform and data acquisition board, such as commercially available from Matrox Co. as model IP-8/AT; or Data Translation Corp. as model DT 2867, and a mapping algorithm embodied on hardware and/or on software suitable for decoding pixels which are variable as to color and intensity.

COLOR AND INTENSITY CORRECTION

It will be appreciated that when measuring both color and intensity, it is important to have a referencing system so that when the laid out dot pattern is read, compensation can be made for reader characteristics and degradation of the printed code. More importantly a reference intensity level must be established from whence the intensities of the various coded elements can be measured. The problem is somewhat complicated by the variation in the light sources associated with the readers, degradation over time of printed dyes and colored elements, and the filtering system parameters in which adjacent color bands or wavelengths must be made as independent as possible.

It is of course the desirable situation that there be complete linearity, at least so far as the intensity levels are concerned. However, this is oftentimes not the case. Secondly, in any practical implementation of such a system, there will be overlap in the bands between adjacent color bands with the radiation in one band contributing to the intensity in another band. While color separation techniques are indeed capable of eliminating much of the crossover phenomena, color band overlap is nonetheless an important problem, especially with numerous intensity levels.

This is no more evident than in a practical system in which one desires to have maximum signal from the reflected or transmitted light from the colored code. In order to achieve maximum signal, the bandpass for each of the color or spectral bands must be wide. However for wide bandpasses, there is an increasing problem of overlap.

In order to accommodate the non-linearities with respect to intensity, given a single color or spectral bandpass filter, as presented hereinafter, standard mathematical techniques can be utilized to correct for color-related intensity variations in which the variation is due to a known non-linearity. In this manner an intensity level of a color can be referenced to a reference dot of this color, such that upon appropriate processing of a signal from a detector for a given color band, its absolute intensity relative to the reference level established by the reference dot can be ascertained. Note, for a three-color system, and assuming linearity, the minimum number of reference dots would be three, each one corresponding, for instance, to the maximum intensity of the particular color. However, non-linearities require a provision of additional reference dots of differing predetermined intensities so as to properly correct for all intensity levels.

Having been able to correct a single color for non-linear intensity characteristics, assuming the aforementioned broad band width of the spectral bands and the concomitant overlap, the mathematical relationships to remove overlap problems are quite complex and interweaved. These complex mathematical relationships, as can be seen hereinafter, can be derived and solved through the utilization of empirical testing with respect to a given system. The constants utilized in the equations which follow can be derived empirically through the provision of a standardized reference set coupled with a correction matrix which transforms the detected signals back to the reference.

It will be appreciated that the subject approach is computation intensive and has not heretofore been implemented due to a prior lack of practical high-speed compact computational engines with sufficiently low-cost memory. However, presently there exist such computational engines and memory in the form of, for instance, high-speed central processing units such as manufactured by Intel, amongst others. The result is that a compact reader station can be assembled for the robust reading of a multi-intensity level, multi-color coded system.

In summary, it is the purpose of the reference dots to provide reference levels for the reader. These reference levels are interpreted in a manner described above so as to provide precise quantization of energy levels relative to a reference level, while at the same time removing artifacts created through the aforementioned overlaps and other types of repeatable, measurable degradation.

More specifically, in the event of usage of colorants having more than one narrow color peak, or having a wide color peak, or involving multiple wavelengths or ranges of wavelengths, it is necessary to disassociate the effect of the undesired portions of colorants other than the subject one, from the subject one. This need for disassociation holds whether the technique used is light transmission or light reflection, or whether the method is by additive coloration or subtractive coloration.

The mathematical treatment of the disassociation is similar whether in transmission, reflection, additive coloration or subtractive.

Note, it must be recalled from elementary physics that the reflection spectra of a set of subtractive primaries are the complements of the reflection spectra of the additive set of primaries. In effect, given a black background to eliminate effects of forward scattering, at each wavelength, the sum of the absorption and of the reflection equals approximately 100 percent, approximately because of unavoidable losses.

Referring to FIG. 4, the relationship between the colorants in the super pixel and the detector array of a solid state camera such as CCD or MOS or similar, depends on the following facts.

FIG. 4a represents the reflection spectra of a typical set of colorants, where the lower limit on the horizontal axis is the shortest wavelength in the band within which the detectors function, and the higher limit is the longest wavelength in the band within which the detectors function. The vertical axis represents percent reflection (or transmission as the case may be). Note the curves $c_1(\lambda)$, $c_2(\lambda)$, $c_3(\lambda)$, are not shifted repeats of one another, the peaks are not the same, nor are the areas under the curves the same, nor must a whole curve be within the detectors' wavelength span.

Figure 4B:
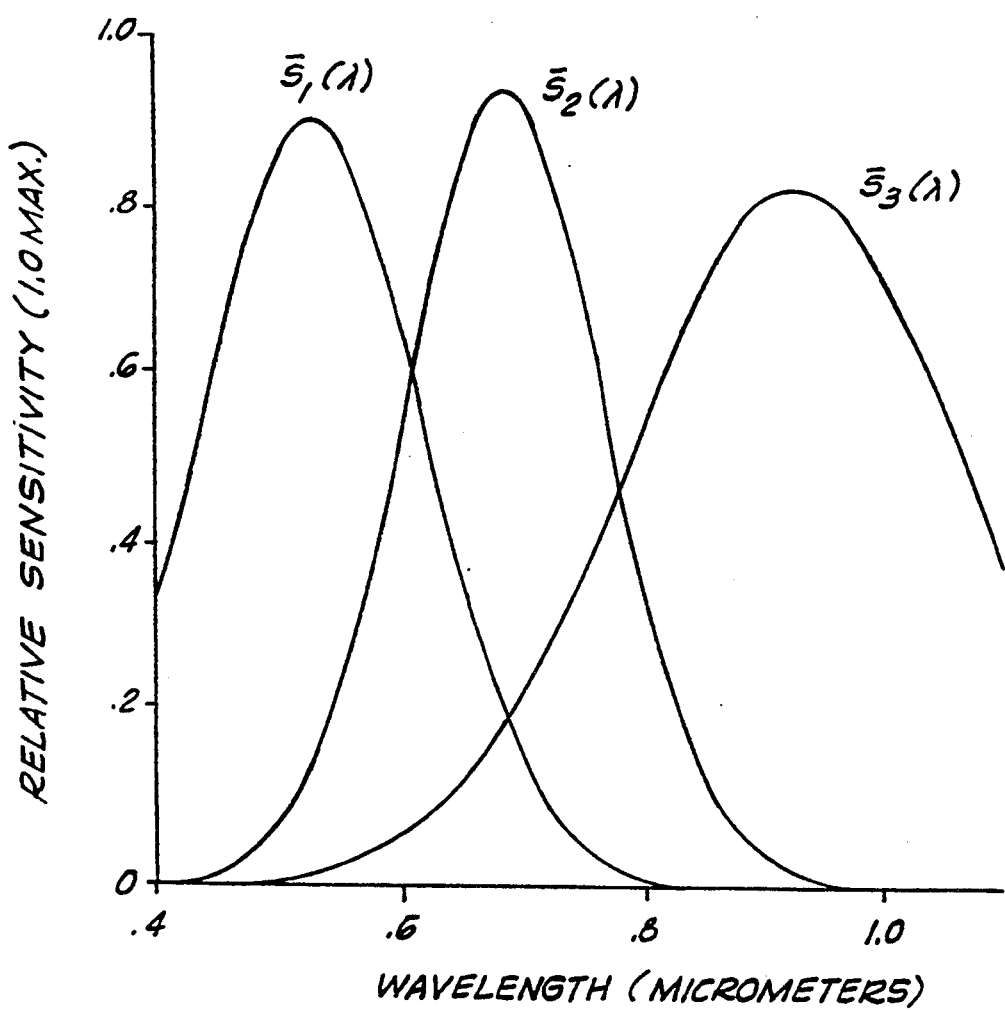
FIG. 4b is a graph of relative sensitivity of a reader vs. wavelength.
Figure 4C:
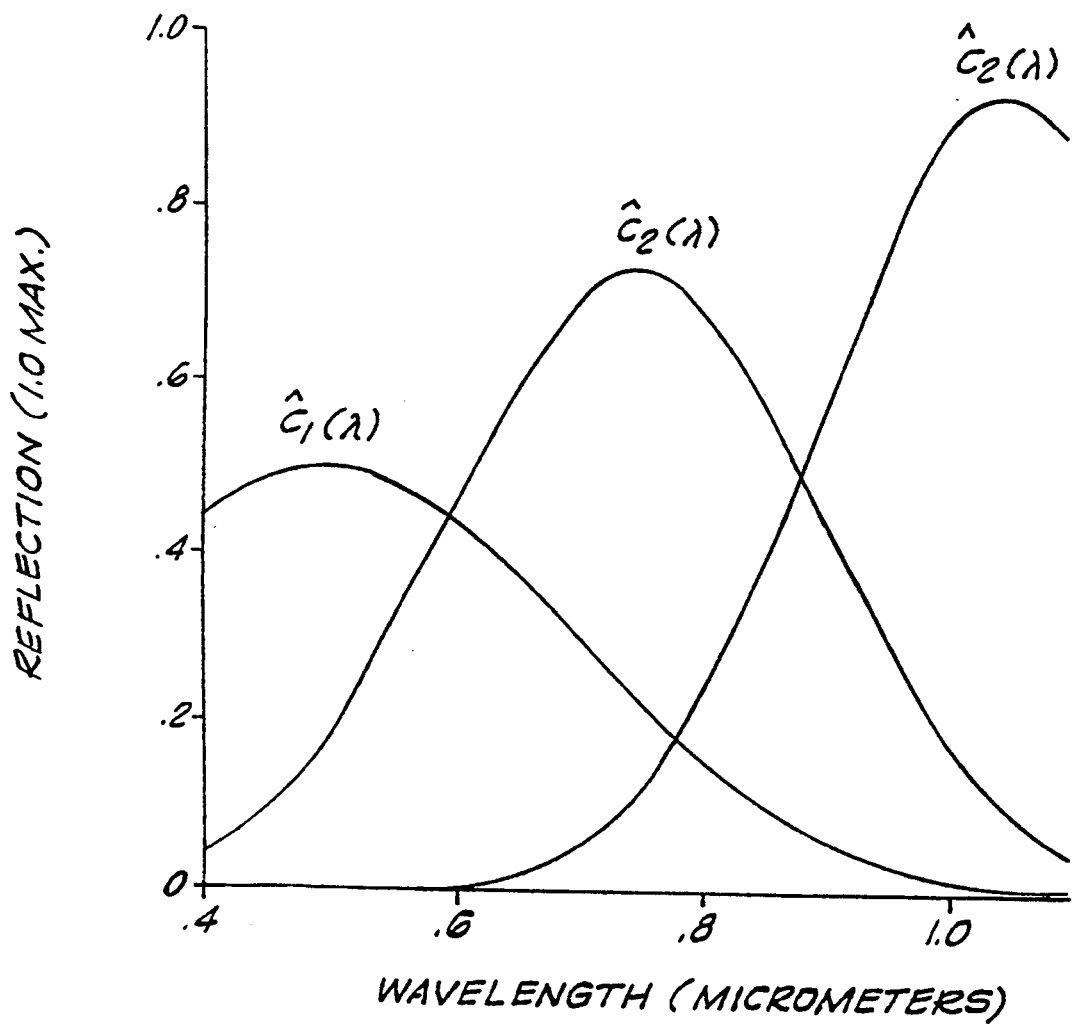
FIG. 4c is a graph of the reflection spectra of a typical set of colorants.

FIG. 4b represents the sensitivity spectra of a typical detector array, over the same wavelength span as FIG. 4a. Here also the curves $\bar{s}_1(\lambda)$, $\bar{s}_2(\lambda)$, $\bar{s}_3(\lambda)$, are not shifted repeats of one another, the peaks are not the same, nor are the areas under the curves the same, nor must a whole curve be within the detectors' wavelength span. Since CCD detectors merely collect charge (electrons), which upon discharge cannot be distinguished as to the wavelength of the energy source, the sensitivity curves are generated by using color optical filters. The system reacts the same if three filters are used sequentially before the detectors, or if the light source is filtered sequentially, or if three individual detectors are used each receiving light independently, filtered through its own independent color filter. The latter is the case in a typical solid state color camera having three detector arrays. In the case where only one segmented array is used, one third of the individual pixels in the array receive light through one filter, a second third through a second filter, and the last third through a third filter.

For simplicity it is assumed that the light source includes all the wavelengths in the subject span.

The net result from the detector being affected by light from the colorants is release of energy flow to the computer, which translates this flow into information it can operate upon to actuate further apparatus.

To eliminate the effect of spurious information deriving from the mismatches between the reflection spectra and the sensitivity spectra, as well as the overlap in both the reflection curves among each other and the individual sensitivity curves among each other, mathematical procedures exist to disassociate the mismatches and overlaps, as well as correct for errors deriving from the light source which is never of equal intensity throughout the subject wavelength span. The mathematical procedures are applied to the information after the information is received by the computer, and are in the form of algorithms. One such procedure is disclosed in U.S. Pat. No. 4,658,286 and applied herein as follows in terms of system properties of a super pixel dot array.

In the subject super pixel dots encoding system, the original digital information is translated into a corresponding set of colorant intensities, which are placed on the regions' addresses, and thereafter constitute the encoded information residing at the addresses of the regions. The writing of information onto media requires knowing the transfer function of the media used, and of the apparatus used to record the information onto the media. This transfer function may not be linear. As shown in FIG. 13, photographic films have a distinctively non-linear transfer function. In the interest of reader simplicity, transformations may be performed onto the signal meant to expose the film, such that the resultant intensity levels distribution on the film become linear.

On read out by the reader, the signals from each region are retranslated into the corresponding colorant intensities, which in turn can retrieve the original digital information. The system is potentially vulnerable to the effects of physical and chemical aging of the super pixel dots. Further, the correspondence between the original region colors and the readers' output signals can be affected by variations in the reader light source, and by variations in the correspondence between the intended printer colors and any systematic differences in the colors actually printed, which may indicate a lack of calibration of the printer itself, but nonetheless are to be expected in an imperfect world. All these systematic errors are automatically included in the correction algorithms which follow.

Following describes the technology for assurance of robust correspondence between the original digital information and the information recovered by the reader. This technology consists of the ability to mathematically analyze the relationship between the coded regions and the reader signals to consider all these imperfections.

As to the mathematical mapping relationship between coded regions and reader signals, the real colorants used to create the super pixel dots are generally not of one narrow bandpass wavelength, but rather spread over a wide wavelength-intensity relationship, and overlapping one to the other. The words "intensity", "strength", and "amplitude" as used in this teaching are synonymous. Due to the expected overlap, one colorant will affect the signal received from another colorant, therefore making the distinction between colorant sources of signal an imperative task. This task of the unraveling of interaffection is in addition to the tasks spelled out, and is among the effects included, in the mapping procedure.

As seen in FIG. 4a, the reader will sense signals from each band; in the figure: band #1, band #2, band #3. In sensing these signals, a portion of the received signal may emanate not from the intended source $\lambda_i$ (i.e. $\lambda_1$, $\lambda_2$, $\lambda_3$,) but rather from adjacent ones, as shown in the shaded areas 45. The described algorithms eliminate this unintended source of signal, thus improve fidelity of information.

The following analysis can be expanded to any number of interaffecting colorants, but will be mainly restricted here to the taught example relative to three colorants.

The relationship between the intensities of the three colorants in an array of super pixel dots and the three signals read out by the reader constitutes a mapping of three quantities of one type into a corresponding three quantities of another type. In encoding an array, the printer emplaces on each region's address a set of colorants of strength $C_{1j}$, $C_{2j}$, $C_{3j}$, corresponding to the original digital information stream, where the subscript 'j' denotes each successive region.

There exist several categories of systematic errors, all corrected by the calibration procedures. First there is aging of the colorants and the arrays of regions built on their basis, in the time gap between the printing or 'writing' and the reading; Secondly there is cross talk and/or gain imbalance among the three or more color components or 'channels' in both the printing processes and the reading processes.

A number of printer parameters affect this correspondence, but consistently so for any individual printer, making it one of the correctable systematic errors.

When the super pixel dots or regions in an array are read, the reader produces signal intensities $S_{1j}$, $S_{2j}$, $S_{3j}$, resulting from each region. These signal intensities depend on some reader parameters, individual to each reader, on the encoded regions, and on any drift in their colors due to aging effects, gain imbalance, and cross talk systematic errors, all correctable by calibration.

Thus, one has a mapping relationship from the quantities $C_{1j}$, $C_{2j}$, $C_{3j}$ to $S_{1j}$, $S_{2j}$, $S_{3j}$, and extracting the original digital information depends on inverting this relationship and converting $S_{1j}$, $S_{2j}$, $S_{3j}$ as read out, to the $C_{1j}$, $C_{2j}$, $C_{3j}$ that were originally encoded, accounting for the changes, if any, between the encoding and decoding processes. These relationships are dependent on several parameter values that are themselves subject to change, as well as on the encoded digital information. Therefore, a calibration procedure is necessary to correct and to make the recovery of the original encoded information as robust as possible.

The technology necessary to perform the required calibrations effectively according to the concepts of U.S. Pat. No. 4,658,286 are described as follows. By this Patent are considered the effects of parameter variations such as, in this case, in the Printer, in the Reader including lighting, and those due to the aging of the encoded regions, all seen as distortions in the information stream. It then teaches a mathematical approach to using such calibration information as can be provided by a sparse set of color reference regions, to evaluate parameters in a transformation that can be applied to the raw signals read out by the Reader $S_{1j}$, $S_{2j}$, $S_{3j}$ to recover the original information content of $C_{1j}$, $C_{2j}$, $C_{3j}$ by offsetting the effects of the above sources of distortion.

Figure 12:
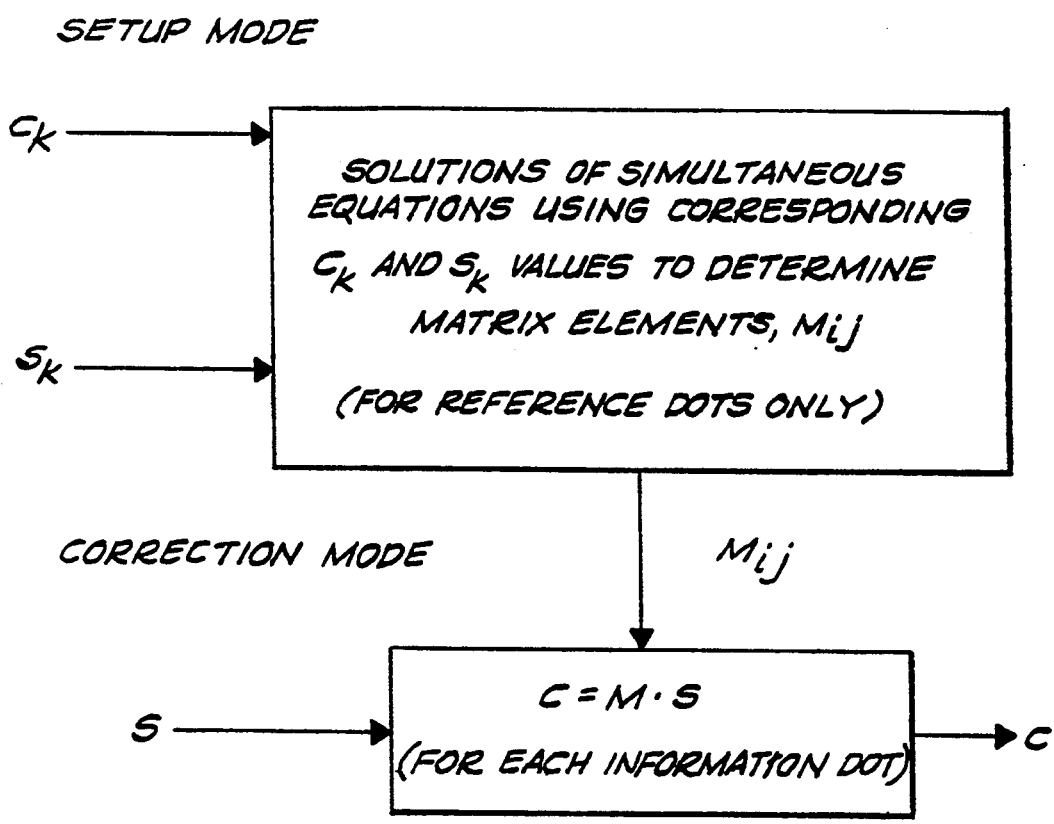
FIG. 12 is a block diagram illustrating setup and correction modes for calibration of a dot code array; and, FIG. 13 is a graph illustrating the non-linearity of color photographic film and paper.

As to specific examples of linear mapping relationships, while the approach taught by U.S. Pat. No. 4,658,286 is sufficiently general to cope with general mapping relationships of the above type, the case of linear relationships has been explored in some detail, and software has been developed by Touchstone Technology Inc., of Arlington, Mass., called Veradyne ™ color correction system, that carries it out. Among the features of this software, which is easily exercised in current microprocessors as programmed in such languages as FORTRAN or C, is that it is fully effective in coping with any effects of reasonable overlap between the spectra of the colorants and of the sensor channels. While such overlap poses difficulties in "pencil and paper" attempts to invert the original colorant intensity values from the reader outputs, it is fully accounted for in the matrix algebra which the microprocessor so readily carries out. The correction algorithm, and the corresponding software, has two modes as shown in FIG. 12. In the "setup mode", the parameter values are determined according to the measured reader outputs and the corresponding known colorant intensities. In the "correction mode" a much simpler algorithm, containing the above determined parameter values, is applied to the signals from each region as they are read out by the reader. The specific form of these algorithms in the linear case consists, for the setup mode, in use of an algorithm derived from solving a set of simultaneous equations using the correspondence between the known $C_{1j}$, $C_{2j}$, $C_{3j}$ and the measured $S_{1j}$, $S_{2j}$, $S_{3j}$ values for the color reference regions alone. These parameters, in the linear case, consist of the nine values of the matrix elements in a linear transformation. With these parameters, evaluated in the setup mode, the solution takes the form of a column matrix composed of reader signals $S_{1j}$, $S_{2j}$, $S_{3j}$ from information regions for each successive information region as it is read out, multiplied by the square matrix of parameter values determined in the set up mode. Since a matrix multiplication consists of a programmed sequence of ordinary multiplications and additions, this transformation can be executed rapidly in current microprocessors. Thus the correction computer of the cited patent is implemented in the computations that take place in the setup mode, when the reader is being initialized with a given code array. Following initialization, the remaining regions of the array are read and transformed to the desired information using the matrix multiplication algorithm with parameters determined in the setup mode. If a number of successive code arrays can be treated as having substantially the same aging, then the calibration procedure need not be repeated as often as the initialization of each array to be read, and even faster readout is possible. The calibration need only be repeated when there is an expectation that a change in the process parameters could have occurred.

Note, some reference dots in the colored regions will consist of maximum intensity primary colors. On calibration the correction matrix coefficients are determined primarily from the reader outputs of these dots.

As to the differences between region codes and image color, while there are many parallels between the mathematics of color coded regions and of visible image color, there is a notable difference. The spectra of the colorants and of the reader wavebands differ from those of colors intended for human perception. In particular, the wavelength range used for color coded regions may be extended into the infrared and UV ranges to the extent that these extensions do not add significant costs to the system. Such extension can increase the robustness of the encoding and decoding system, as the peak wavelengths in use are further apart. It is reasonable to use the wavelength range from under 400 nm to over 1100 nm, in which many electronic sensors and commercial camera lenses are capable of functioning without any complications.

An important degree of redundancy inherent in the region coding method is that it uses an ample spacing between the values of $C_{1j}$, $C_{2j}$, $C_{3j}$ that are used to represent integers. Essentially, the allowable values corresponding to sets of integers $1$, $m$, $n$ are spaced far enough apart that the spacing exceeds the error of determination of the C values through all of the above process. Since there would normally be a lookup table whose entries consist of the allowable $C_{1j}$, $C_{2j}$, $C_{3j}$ values and their corresponding $1$, $m$, $n$ digital values they serve to encode, then as each C value is determined, it may be replaced by the nearest allowable tabulated value. Such an operation corresponds to the application of discrimination levels to binary information and constitutes a generalization of that advantage of digitization to the case of color coded regions.

Referring now to FIG. 12 an implementation of setup and correction modes for dot code array application, in the setup mode, $C_k$ corresponds to colorant values, which are known quantities for reference dots. $S_k$ corresponds to signals read out from known reference dots, solutions of simultaneous equations using corresponding $C_k$ and $S_k$ values to determine matrix elements $M_{ij}$.

In this correction mode, correction mode, $M_{ij}$ is read out to the correction box $C=MS$, where S corresponds to signals read out from information dots. This block converts $S_{1j}$, $S_{2j}$, $S_{3j}$ as read at each information dot, using known values of $M_{ij}$, to the corresponding set of colorant values $C_{1j}$, $C_{2j}$, $C_{3j}$. The result is C, i.e. colorant values as originally entered in the dot array. This is mathematically equivalent to:

$$\begin{pmatrix} C_{1j} \\ C_{2j} \\ C_{3j} \end{pmatrix} = M \begin{pmatrix} S_{1j} \\ S_{2j} \\ S_{3j} \end{pmatrix}$$

In writing and reading color encoded dots, there are some analogies to visible color imaging, but also several distinct differences.

As to reader color space, one of the key elements in the system is the subsystem that converts a color on an encoded super pixel dot into a corresponding set of numbers in digital form. The present example is written in terms of a 3 channel system. All equations are written in such form that the extension to an N channel system, with N at 3 or higher, are obvious. The readings of the successive reader channels, based on the physics of filtered detectors, may be expressed in terms of the illumination which the reader focuses on the super pixel dot, the reflection spectrum of the super pixel dot, and the channel filter response as follows:

$$S_1 = \int I_{scan}(\lambda) r(\lambda) s_1(\lambda) d\lambda$$

$$S_2 = \int I_{scan}(\lambda) r(\lambda) s_2(\lambda) d\lambda$$

$$S_3 = \int I_{scan}(\lambda) r(\lambda) s_3(\lambda) d\lambda \qquad [1]$$

The signals that are detected by the reader and then digitized i.e. converted from analog signals to digital form are $S_1$, $S_2$, and $S_3$. One may consider $S_1$, $S_2$, and $S_3$ as coordinates of points in reader space. In these equations, $I_{scan}(\lambda)$ is the spectrum of the illuminating light source in the Reader, $r(\lambda)$ is the reflection coefficient of the coded super pixel dots, and $\bar{s}_1(\lambda)$, $\bar{s}_2(\lambda)$, and $\bar{s}_3(\lambda)$ are the spectra of the detector filter combinations in the respective 3 channels of the reader. The average reflectivity spectrum over the code super pixel dot being scanned is $r(\lambda)$. Suppose there are three colorants with respective spectra $c_1(\lambda)$, $c_2(\lambda)$, and $c_3(\lambda)$. The total amounts of each colorant put down on the super pixel dot are $C_1$, $C_2$, and $C_3$. One may consider $C_1$, $C_2$, and $C_3$ as coordinates of points in colorant space.

With the above definitions established, the application of algorithms that correct the reproduction of the coded information, as in U.S. Pat. No. 4,658,286 are now introduced.

One attractive encoding method involves the use of additive mixtures of pigment granules. Three colorants are chosen with substantially different reflectivity spectra. Their performance will be best if their peak reflectivity wavelengths are uniformly separated through the region of the wavelength spectrum to which the detectors or imaging receptors are sensitive. These reflectivity spectra are generally broad enough for most practical colorants that the "skirts" overlap.

For example, at the wavelength where channel 1 has its peak reflectivity, channel 2 may have 10% reflectivity, and channel 3 may have 3%. While such overlap of colorant spectra adds some mathematical complexity to determination of the fraction of each colorant in a super pixel dot by the reader, it does not prevent this determination with appropriate processing of the reader signals from each super pixel dot.

Let the three colorant spectra be denoted by $c_1(\lambda)$, $c_2(\lambda)$, and $c_3(\lambda)$. For example, with 1000 granules of colorant fitting on each encoded super pixel dot, we can achieve a specific encoding by choosing $C_1$ granules of colorant 1, $C_2$ granules of colorant 2, and $C_3$ granules of colorant 3. Any remaining locations on the dot should be black. Thus, in this example, if the sum $$SUM = C_1 + C_2 + C_3$$

is less than 1000, the dot should have $1000 - SUM$ black granules. Note the number of granules $C_1$, $C_2$ or $C_3$ controls the intensity. Thus, $C_1$, $C_2$, and $C_3$ are intensities for the given color. The corresponding percentage composition is then given. In one embodiment of such an additive system are given by $C_1(\lambda)$, $C_2(\lambda)$, and $C_3(\lambda)$ according to equation [3] below. With additive combination on a black background, the overall effective reflection spectrum of the super pixel dot, assuming that the colorants have been effectively blended, is given by $$r(\lambda) = C_1 C_1(\lambda) + C_2 C_2(\lambda) + C_3 C_3(\lambda) \quad [2]$$

When the super pixel dot is read back in the reader, the objective of the signal processing will be to determine $C_1$, $C_2$, and $C_3$ which contain the encoded information that corresponds to these values, by processing the reader signal. To explain how this is done, we make use of equation [1] which shows the detector signals, $S_1$, $S_2$, and $S_3$ resulting from reflectivity spectrum r ($\lambda$) at the scanned spot.

RELATION BETWEEN READER OUTPUT AND COLORANTS FOR A GIVEN SUPER PIXEL DOT

For a general case, given a reader illumination spectrum $I_{scan}(\lambda)$, filter detector spectral responses $s_1(\lambda)$, $s_2(\lambda)$ and $s_3(\lambda)$, colorant spectra $c_1(\lambda)$, $c_2(\lambda)$, and $c_3(\lambda)$, and colorant intensities $C_1$, $C_2$, and $C_3$ the Reader output signals $S_1$, $S_2$, and $S_3$ are given by $$S_1 = C_1 \int I_{scan}(\lambda) s_1(\lambda) c_1(\lambda) d\lambda + \quad [3]$$
$$\phantom{S_1 =} C_2 \int I_{scan}(\lambda) s_1(\lambda) c_2(\lambda) d\lambda +$$
$$\phantom{S_1 =} C_3 \int I_{scan}(\lambda) s_1(\lambda) c_3(\lambda) d\lambda$$

$$S_1 = C_1 \int I_{scan}(\lambda) s_2(\lambda) c_1(\lambda) d\lambda +$$
$$\phantom{S_1 =} C_2 \int I_{scan}(\lambda) s_2(\lambda) c_2(\lambda) d\lambda +$$
$$\phantom{S_1 =} C_3 \int I_{scan}(\lambda) s_2(\lambda) c_3(\lambda) d\lambda$$

$$S_1 = C_1 \int I_{scan}(\lambda) s_3(\lambda) c_1(\lambda) d\lambda +$$
$$\phantom{S_1 =} C_2 \int I_{scan}(\lambda) s_3(\lambda) c_2(\lambda) d\lambda +$$
$$\phantom{S_1 =} C_3 \int I_{scan}(\lambda) s_3(\lambda) c_3(\lambda) d\lambda$$

In these equations, note that the integrals evaluated over the wavelength band used are all fixed coefficients. They may be evaluated by calculation, once it is noted that these integrals form a square matrix.

These coefficients may be determined by measurement from the matrix N evaluated below. The evaluation is by the method shown from the data values obtained from reader outputs $S_{1j}$, $S_{2j}$, and $S_{3j}$, where j=1, ..., m and where 'm' is the number of super pixel reference dots and the corresponding colorant values of the reference dots.

The corresponding colorant intensities are $C_{1j}$, $C_{2j}$, and $C_{3j}$. This mathematical procedure or the formulas derived from it determine the coefficient values $M_{ij}$. It is carried out in the setup mode and involves only the color reference regions.

Once the calibration procedure has been completed, all the regions are sequentially read out by the reader as $S_{1j}$, $S_{2j}$, and $S_{3j}$ for each region as denoted by subscript index 'j'. At this point the values in matrix M have been calculated, and are applied to the reader signals to obtain the colorant intensities via the following:

$$C = MS$$

which is identical to:

$$C_{1j} = M_{11}S_{1j} + M_{12}S_{2j} + M_{13}S_{3j}$$
$$C_{2j} = M_{21}S_{1j} + M_{22}S_{2j} + M_{23}S_{3j}$$
$$C_{3j} = M_{31}S_{1j} + M_{32}S_{2j} + M_{33}S_{3j}$$

and to the reciprocal relationship:

$$S_{1j} = N_{11}C_{1j} + N_{12}C_{2j} + N_{13}C_{3j}$$
$$S_{2j} = N_{21}C_{1j} + N_{22}C_{2j} + N_{23}C_{3j}$$
$$S_{3j} = N_{31}C_{1j} + N_{32}C_{2j} + N_{33}C_{3j}$$

which is identical to S=NC where $$N = M^{-1}$$

These operations can be very rapidly carried out with a microprocessor, as is well known to those proficient in the art.

CORRECTION FOR AGING OF SUPER PIXEL DOTS

As long as the color reference super pixel dots have known initial values of $C_1$, $C_2$, and $C_3$, then the same method of determining the M values will work as long as the original C values are used with the corresponding S outputs with data taken from the super pixel color reference dots. If, now, when the information super pixel dots are scanned, if these M values are applied as each set of S values is read from a reinitialization or information super pixel dot, then the C values determined by the above relationship approximate the original, un-aged colorants.

The reason this is so follows from the method of the effective inverse taught in U.S. Pat. No. 4,658,286. The distortion due to aging and several other system factors, including the illumination $I_{scan}(\lambda)$, and systematic errors in the encoder, and printer, or writer machines, affects the color reference regions. Using this matrix to extract the C values from the information regions effectively cascades an effective inverse distortion to the distorted colors of the information super pixel dots.

Methods are provided for dealing with non-linearities in the reader detector and electronic systems, in the above U.S. Pat. No. 4,658,286.

IMPLEMENTATION OF MATRIXING

In this section, the mathematics implementing the encoding of signals to corresponding colorant strengths by matrixing is discussed in detail. This represents the bars or dots array printing or writing process and corresponds to FIGS. 4a, 4b, and 4c.

Defining 'primary colors' in a printer, these are the colors that may be intermixed in any desired proportion, to create colors that to the human eye, appear distinctly different than the primaries used. In the reader the primaries are considered to be the three (or other) spectral responses of the detector channels. In a specific application, these channels can be color defined by use of appropriate color filters. Considering the case of three primary colors, as represented by wavelength bands, referenced as being one embodiment in this patent, the electronic signals are $S_{11}$, $S_{21}$, $S_{31}$ corresponding to the Red, Green, and Blue components of the first color or wavelength band. Correspondingly for the second, they are $S_{12}$, $S_{22}$, $S_{32}$, and for the third color they are $S_{13}$, $S_{23}$, $S_{33}$. The same relations apply in general to all the dots in a bars or dots array, not just a selected set of three, but beyond the first three colors, the relationship between the C's and S's carries no further information about the transformation represented by matrix M. In this example, index k of FIG. 5 has 3 values.

Due to possible printer or writer and reader channel or bandpass imbalances, overlaps in the individual components of the spectra of the colorants and of the wavebands, and other possible reasons, the corresponding colorant intensity values are $C_{11}$, $C_{21}$, and $C_{31}$ for the first colorant, $C_{12}$, $C_{22}$, $C_{32}$ for the second colorant, $C_{13}$, $C_{23}$, $C_{33}$ for the third colorant. Each reader output is a linear combination of colorant intensity values and vice versa since each combination of colorant intensity values is a linear combination of Reader outputs. These outputs and values are interelated by the following equations:

In the following equations $M_{ij}$ are the set of nine coefficients for the equations, where the subscript 'i' represents the colorant number, and the subscript 'j' represents the reader waveband. For any given super pixel dot array, these nine coefficients are identical for all the individual super pixel dots.

For the first colorant:

$$C_{11}=M_{11}S_{11}+M_{12}S_{21}+M_{13}S_{31}$$

$$C_{21}=M_{21}S_{11}+M_{22}S_{21}+M_{23}S_{31}$$

$$C_{31}=M_{31}S_{11}+M_{32}S_{21}+M_{33}S_{31}$$

For the second colorant:

$$C_{12}=M_{12}S_{12}+M_{12}S_{22}+M_{13}S_{32}$$

$$C_{22}=M_{22}S_{12}+M_{22}S_{22}+M_{23}S_{32}$$

$$C_{32}=M_{32}S_{12}+M_{32}S_{22}+M_{33}S_{32}$$

For the third colorant:

$$C_{13}=M_{13}S_{13}+M_{13}S_{23}+M_{13}S_{33}$$

$$C_{23}=M_{23}S_{13}+M_{23}S_{23}+M_{23}S_{33}$$

$$C_{33}=M_{33}S_{13}+M_{33}S_{23}+M_{33}S_{33}$$

Taken together there are nine simultaneous linear equations to determine the nine coefficients in $M_{ij}$.

In order to deal with equations of this type, it is generally desirable to use matrix notation.

The nine coefficients $M_{ij}$ form a matrix:

$$M = \begin{pmatrix} M_{11} & M_{12} & M_{13} \\ M_{21} & M_{22} & M_{23} \\ M_{31} & M_{32} & M_{33} \end{pmatrix}$$

The nine colorant intensity values may be represented in matrix form as U:

$$U = \begin{pmatrix} C_{11} & C_{12} & C_{13} \\ C_{21} & C_{22} & C_{23} \\ C_{31} & C_{32} & C_{33} \end{pmatrix}$$

The nine reader output signals may be represented in matrix form as V:

$$V = \begin{pmatrix} S_{11} & S_{12} & S_{13} \\ S_{21} & S_{22} & S_{23} \\ S_{31} & S_{32} & S_{33} \end{pmatrix}$$

The set of simultaneous equations can therefore be written as follows:

$$\begin{pmatrix} C_{11} & C_{12} & C_{13} \\ C_{21} & C_{22} & C_{23} \\ C_{31} & C_{32} & C_{33} \end{pmatrix} = \begin{pmatrix} M_{11} & M_{12} & M_{13} \\ M_{21} & M_{22} & M_{33} \\ M_{31} & M_{32} & M_{33} \end{pmatrix} \begin{pmatrix} S_{11} & S_{12} & S_{13} \\ S_{21} & S_{22} & S_{23} \\ S_{31} & S_{32} & S_{33} \end{pmatrix}$$

The latter equation may be written more compactly as follows:

$$U=MV$$

Derived from the latter equation, the desired calibration matrix is as follows:

$$M=UV^{-1}$$

where $V^{-1}$ is the inverse of square matrix V.

A closely related set of coefficients is the matrix inverse to M, i.e. $N=M^{-1}$ which is readily evaluated, given M and for which $V=NU$.

This form, containing the same information, relates N directly to the coefficients in equation $U=MV$ above.

It can thus be seen that, while the ratios of signal strengths and colorant strengths is not the same, they bear a direct correspondence as expressed by the stated matrix relationship.

It can thus be seen how three colorant intensities deriving from three different colorant sources may be calibrated exactly by using matrix M.

EXPANSION OF TECHNIQUE FOR A NUMBER OF REFERENCE SUPER PIXEL DOTS GREATER THAN THE NUMBER OF COLORANTS OR WAVEBANDS

In the common case where the number of Reference dots is greater than the number of colorants or wavelengths, there is an excess in the number of simultaneous equations over rows and columns in the M matrix. In that case the coefficient values are mathematically 'overdetermined'. The following application of the mathematical method of Least Squares resolves this ambiguity.

The calibrating matrix M may now be determined by requiring the $3 \times n$ matrix $(U-V)$ to be as small as possible. Let the $3 \times n$ elements of this matrix be denoted by $(U-V)_{ij}$. The components of M are determined by minimizing the following quantity:

$$\nabla = \sum_{ij} [(U - MV)_{ij}]^2$$

the above quantity $\nabla$ may be rewritten in the following form:

$$\nabla = Tr[(U-MV)(U-MV)^T]$$

where the superscript 'T' denotes the transpose of the matrix to which it applies; and where "Tr" denotes taking the trace i.e. the sum of the prime diagonal elements).

Defining P and Q based on the calibration data in U and V as follows:

$$P = VV^T$$

$$Q = UV^T$$

It is noteworthy that matrices P and Q are square n $\times$ n matrices, regardless of the number of reference super pixel dots used in the calibration procedure.

In terms of Q and P, the quantity may be written as follows:

$$\nabla = Tr[UU^T - 2QM^T + MPM^T]$$

Differentiation with respect to the nine parameters $M_{ij}$ to find the minimum of the quantity $\nabla$, yields the following result:

$$Q = MP$$

From the above result, one calculates the calibration matrix M as follows:

$$M = QP^{-1}$$

The above is the generalization of the earlier stated equation for exactly three reference super pixel dots where n=3 (i.e. 3 colorants), as follows:

$$M = UV^T(VV^T)^{-1} = UV^T(V^T)^{-1}V^{-1} = UV^{-1}$$

The computation of the quantity resulting in $\nabla = 0$, assures that no inconsistent calibration regions exist. U.S. Pat. No. 4,658,286 describes the property of figure of merit and its use to determine the quality of the calibration. Note that with this quality assurance technique, inconsistent reference regions may be identified and discarded.

MORE THAN THREE COLORANTS OR COLOR WAVEBANDS

Where more than three colorants are used, the above teaching may be further generalized by expanding the definitions of U and V as follows, for 'm' colorants and 'n' colored reference regions:

For this purpose the previous definitions of U and V are broadened as follows:

$$U = \begin{pmatrix} C_{11} & C_{12} & \cdots & C_{1n} \\ C_{21} & C_{22} & \cdots & C_{2n} \\ \cdot & \cdot & & \cdot \\ \cdot & \cdot & & \cdot \\ \cdot & \cdot & & \cdot \\ C_{m1} & C_{m2} & \cdots & C_{mn} \end{pmatrix}$$

$$V = \begin{pmatrix} S_{11} & S_{12} & \cdots & S_{1n} \\ S_{21} & S_{22} & \cdots & S_{2n} \\ \cdot & \cdot & & \cdot \\ \cdot & \cdot & & \cdot \\ \cdot & \cdot & & \cdot \\ S_{m1} & S_{m2} & \cdots & S_{mn} \end{pmatrix}$$

where the additional columns in the matrices represent all the reference dots 'n', including the additional ones beyond three.

APPLICATION OF THE CALIBRATION PROCEDURE

In printing encoded labels, the color reference dots are printed interspersed with information dots at controlled locations so that their coloration is affected by substantially the same physical and chemical factors as the information dots.

In reading the labels, calibration requires operation in two distinct modes. First, in the set up mode (cf FIG. 12), in which only the color reference dots are read. At each color reference dot, denoted by subscript k, the corresponding reader signals, $S_{1k}$, $S_{2k}$, $S_{3k}$ for the respective color channels are read, and the values stored.

Some of these values of $S_{ik}$ will represent the same reference colors. Before any further calibration procedures are carried out, these supposedly identical reader outputs may be compared. If "within tolerance", the reference dots are consistent, and there is some indication of the reliability of the procedure. If such a consistency cross check fails, a warning may be given to the system operator, such as an audible alarm, to indicate a special need for caution with that label reading.

Of the non-redundant color reference dots, a selection may be made of the ones to be used as "touchstones"—the values of which will be used in the sets of simultaneous equations represented by S=NC and its expanded form presented above with the values of index j taken to match index m of FIG. 12—representing only the color reference dots at which the selected touchstone reference colorant combinations, $C_{im}$ are found. (Any other color reference dots may be useful in consistency cross checks following calibration, but are not used explicitly in the calibration procedure).

For each reference dot that is taken to be a touchstone, i.e. for the values of index m, corresponding values of $S_{im}$ and $C_{im}$ are known. Given at least as many distinct touch stones as the number of primary colorants (three in the current example), the mathematical theory of equations states that for the corresponding nine component equations, the nine unknowns—coefficients of matrix N—are uniquely determined. Algorithms for carrying out such determinations are well known in the art of computation.

Equivalently, the related matrix M is determined. It is the inverse matrix to N. In the language of U.S. Pat. No. 4,658,286, we might say that S=NC is a reproduction of encoded information in which the colorants C correspond to the desired representation of the original symbols, and S represents corresponding electronic signal outputs, subject to various distortions and drift effects. An "effective inverse" in this example is the application of C=MS, which acts on the measured signals S to reproduce colorant values C as a "best approximation". Since M is determined from the calibration data in the setup mode, then as each set of three color channel signals, $S_{ik}$ is read out, a simple multiplication of these values by the constant matrix M produces the desired set of colorant values for the information dots, $C_{ik}$.

Note, simple cross check is available in that at the color reference dots, the known colorant values should match the values read out by this procedure after calibration.

(As a practical matter, at each dot, a set of three numbers is read out and converted. This is, C=MS is equivalent to $$\begin{pmatrix} C_{1m} \\ C_{2m} \\ C_{3m} \end{pmatrix} = M \begin{pmatrix} S_{1m} \\ S_{2m} \\ S_{3m} \end{pmatrix}$$

which applies for each successive value of m. This type of calculation is well known in the computational art.)

DOT DENSITY

Using n=3, k=64, dots 40 microns×40 microns, and if the active field of view is restricted to no more than 1 mm×1 mm, one obtains a field of 25×25=625 dots.

If in the same field one makes each dot 15 microns×15 dot represents 18 bits, the total quantity in such an array is 78408 bits, or 9801 bytes per square millimeter. This is equivalent to 104 Megabytes on a disc at 120 mm OD having a 30 mm ID. The information density thus already compares favorably with CD technology in the latter's ability to store 400 to 600 Mbytes in that area using tracks 0.3 micron wide, 1.3 microns apart.

However, if n=3, k=64, and the dots are 3 microns×3 microns, the equivalent disc would contain 1178 Mbytes. Moreover, if n=10, k=64, using 3 micron×3 micron dots, the equivalent disc would contain over 7700 Mbytes.

As will be appreciated, the amount of storable information depends on the size of the colored areas or dots, the size of the array, the number of colors actually discernable, the number of distinguishable intensity levels, arbitrarily chosen factors for redundancy in the system design, and other factors.

The size of the super pixel dot is limited only by the theory and practice of colorants and of sensor elements. It is commonplace to believe that only regions being as large or larger than the wavelength of the light frequency being recorded or 'read', could be sensed. This assertion is not precise, as the presence of several elements of the subject specific frequency, each much smaller than the wavelength, but spread over an area sufficiently large, can be detected and singled out. The intensity of the signal from the given area depends on the number and size of such minute elements, the more elements there are, the stronger the signal.

The sensor elements involved in this discussion include the solid state arrays or equivalent active elements, appropriate optical devices such as lenses and filters and diffractors, each suitable for the frequency of the electromagnetic signal being processed.

To reduce the cost of the camera with respect to cameras using three CCD arrays, a single CCD array can be chosen, e.g. having 768×492 elements, using the frame transfer method and the RGB stripe color separation. This means that a dot will be rectangular, 6 pixels high ×2 pixels wide assuming each dot to be visible by four pixel groups. The number of dots will then be a maximum of 123×242=29766 dots.

An alternative commonplace camera uses an array of 768×492 elements, interline transfer, and stripe color filters. This means that the dot will be rectangular, 12 pixels high×2 pixels wide. The number of dots will then be a maximum of 64×246=15744.

Another alternative method is using a monochrome Solid State camera with frame transfer such as the Panasonic GP-HF 702, and illuminate the code array sequentially with lights of the n number of colors used to create the code (in the example above n=3). This technique provides the highest information density, at the expense of a somewhat longer reading duration.

The only limitations to the size of the solid state array and its type is technological availability. None of the statements in the discussion herein should be read to imply a restriction on the sensing technology (e.g. electron beam, CCD, MOS, other), nor on the number of pixel elements in a solid state array sensor.

Note, the shape of colored regions is not critical. The regions may be round, oval, square, rectangular, etc., or elongatedly rod or bar-like, or even amorphous without well defined borders, or even with edges somewhat overlapping with the next region.

If the purpose is to prevent counterfeiting of documents, such an array can be used in conjunction with an algorithm to write and read the microlabels such that a percentage of the codes are fillers, randomly placed and encoded, whereas the rest includes relevant information. It is important to note that each array bears a different code to the human eye, yet all would be deciphered by the algorithm the same way. Due to the presence of different headers for each segment of the colored dot array, even if a segment contains the self-same information, the presence of different header dots alters the color pattern in the information dots sequence. This is due to the 'spillover' effect, of a dot containing more than precisely a round number of bytes. Similarly, since each colored dot array bears a unique identifier number or alphanumeric, the whole sequence of colors is altered to an observer, even if the information content remains otherwise identical. Moreover, in cryptology it is quite common to use an encryption algorithm different from the deciphering one. Therefore, lacking the encryption algorithm, counterfeiting is likewise rendered well neigh impossible.

Assuming usage of a conventional 3 CCD color camera, each CCD consists of an array of 768×492 elements. However only 768×256 are conventionally available for image pickup, due to interline transfer. If one allocates four elements to each dot, the number of color bearing areas or dots could be as many as 384×128=49152. However, many CCD pixels would be non-information bearing pixels focused beyond the periphery of a dot array; other pixels are focused on non-information bearing dots. Therefore one can assume that the maximum number of dots is no more than 20000. Even this number is sufficiently large to enable representation of a couple dozen printed pages.

CODING EXAMPLES

As to encoding, without regard to reference standards and to either color or intensity correction, the following is the text of the label encoded by the following code structure:
Input field, group 1, Ship from:
  Motorola
  ZYZ Plant 5 Elm Street
Anytown, Ariz. 23456-7890
Input field, group 2, Ship to:
Joe Customer
GenCo
12 Main Street
Somerville, Mass. 02145-4381
Input field, group 3, Ship Info:
Sep. 5,1991
Federal Express
3.05 kg.
$895.90
$852.31
1234567
9853223
(empty field)
(empty field)
Input field, group 4, Quality Assurance data:
43567912
Feb. 5,1991
67
Mar. 5, 1991
0
3
3 colors, 32 levels, 20 Column Width 15 bits per Block, 5 bits per Color
Row 1
Column 1,
    Red:10 Green:27 Blue:14
Column 3,
    Red:25 Green:12 Blue:8
Column 4,
    Red:30 Green:1 Blue:26
Column 5,
    Red:29 Green:21 Blue:12
Column 6,
    Red:7 Green:28 Blue:5
Column 7,
    Red:20 Green:6 Blue:17
Column 8,
    Red:15 Green:23 Blue:29
Column 9,
    Red:16 Green:24 Blue:15
Column 10,
    Red:25 Green:2 Blue:11
Column 11,
    Red:13 Green:13 Blue:2
Column 12,
    Red:21 Green:10 Blue:18
Column 13,
    Red:15 Green:27 Blue:17
Column 14,
    Red:4 Green:5 Blue:20
Column 15,
    Red:6 Green:32 Blue:28
Column 16,
    Red:14 Green:12 Blue:8
Column 17,
    Red:17 Green:27 Blue:17
Column 18,
    Red:3 Green:14 Blue:31
Column 19,
    Red:14 Green:27 Blue:32
Column 20,
    Red:23 Green:29 Blue:16
Row 2
Column 1,
    Red:20 Green:30 Blue:17
Column 2,
    Red:2 Green:11 Blue:4
Column 3,
    Red:11 Green:1 Blue:28
Column 4,
    Red:13 Green:22 Blue:6
Column 5,
    Red:9 Green:17 Blue:19
Column 6,
    Red:30 Green:17 Blue:30
Column 7,
    Red:7 Green:30 Blue:1
Column 8,
    Red:22 Green:2 Blue:6
Column 9,
    Red:11 Green:4 Blue:9
Column 10,
    Red:6 Green:19 Blue:30
Column 11,
    Red:23 Green:2 Blue:27
Column 12,
    Red:21 Green:21 Blue:28
Column 13,
    Red:6 Green:17 Blue:27
Column 14,
    Red:17 Green:3 Blue:2
column 15,
    Red:27 Green:30 Blue:29
Column 16,
    Red:10 Green:32 Blue:28
Column 17,
    Red:24 Green:28 Blue:14
Column 18,
    Red:23 Green:1 Blue:11
Column 19,
    Red:17 Green:27 Blue: 3
Column 20,
    Red:5 Green:26 Blue:7 Row 3
Column 1,
    Red:4 Green:14 Blue:22
Column 2,
    Red:26 Green:23 Blue:23
Column 3,
    Red:15 Green:4 Blue:15
Column 4,
    Red:26 Green:12 Blue:7
Column 5,
    Red:17 Green:27 Blue:17
Column 6,
    Red:3 Green:1 Blue:22
Column 7,
    Red:2 Green:6 Blue:19
Column 8,
    Red:21 Green:28 Blue:17
Column 9,
    Red:24 Green:15 Blue:27
Column 10,
    Red:2 Green:19 Blue:26
Column 11,
    Red:10 Green:24 Blue:13
Column 12,
    Red:23 Green:10 Blue:7
Column 13
    Red:12 Green:1 Blue:30
Column 14,
    Red:13 Green:26 Blue:32
Column 15,
    Red:15 Green:30 Blue:17

Column 16,
    Red:4 Green:5 Blue:26
Column 17,
    Red:25 Green:3 Blue:9
Column 18,
    Red:20 Green:3 Blue:30
Column 19,
    Red:21 Green:2 Blue:8
Column 20,
    Red:9 Green:21 Blue:32
Row 4
Column 1,
    Red:14 Green:30 Blue:1
Column 2,
    Red:11 Green:4 Blue:11
Column 3
    Red:9 Green:26 Blue:24
Column 4,
    Red:12 Green:7 Blue:9
Column 5,
    Red:4 Green:23 Blue:31
Column 6,
    Red:26 Green:10 Blue:32
Column 7,
    Red:28 Green:14 Blue:24
Column 8,
    Red:13 Green:26 Blue:2
Column 9,
    Red:11 Green:4 Blue:11
Column 10,
    Red:29 Green:25 Blue:19
Column 11,
    Red:30 Green:31 Blue:17
Column 12,
    Red:16 Green:4 Blue:21
Column 13,
    Red:7 Green:21 Blue:9
Column 14,
    Red:13 Green:19 Blue:2
Column 15,
    Red:21 Green:7 Blue:4
Column 16,
    Red:15 Green:27 Blue:15
Column 17,
    Red:4 Green:21 Blue:10
Column 18.
    Red:10 Green:24 Blue:12
Column 19,
    Red:1 Green:22 Blue:2
Column 20,
    Red:6 Green:7 Blue:30
Row 5
Column 1,
    Red:28 Green:14 Blue:24
Column 2,
    Red:13 Green:26 Blue:14
Column 3,
    Red:16 Green:27 Blue:13
Column 4,
    Red:20 Green:30 Blue:19
Column 5,
    Red:26 Green:3 Blue:9
Column 6.
    Red:14 Green:7 Blue:9
Column 7,
    Red:17 Green:1 Blue:20
Column 8,
    Red:13 Green:18 Blue:18
Column 9,
    Red:23 Green:27 Blue:1
Column 10,
    Red:11 Green:12 Blue:21
Column 11,
    Red:14 Green:7 Blue:29
Column 12,
    Red:3 Green:4 Blue:9
Column 13,
    Red:14 Green:9 Blue:2
Column 14,
    Red:17 Green:27 Blue:17
Column 15
    Red:3 Green:10 Blue:27
Column 16,
    Red:14 Green:25 Blue:
Column 17,
    Red:8 Green:30 Blue:1
Column 18,
    Red:26 Green:29 Blue:21
Column 19,
    Red:12 Green:7 Blue:28
Column 20,
    Red:5 Green:20 Blue:6
Row 6
Column 1,
    Red:17 Green:15 Blue:23
Column 2,
    Red:29 Green:16 Blue:24
Column 3,
    Red:15 Green:25 Blue:2
Column 4,
    Red:27 Green:13 Blue:13
Column 5,
    Red:2 Green:21 Blue:10
Column 6,
    Red:18 Green:15 Blue:27
Column 7,
    Red:17 Green:4 Blue:21
Column 8,
    Red:5 Green:30 Blue:23
Column 9,
    Red:26 Green:16 Blue:12
Column 10,
    Red:8 Green:17 Blue:27
Column 11,
    Red:17 Green:3 Blue:17
Column 12,
    Red:6 Green:24 Blue:24
Column 13,
    Red:1 Green:12 Blue:14
Column 14,
    Red:16 Green:6 Blue:24
Column 15,
    Red:25 Green:1 Blue:11
Column 16,
    Red:4 Green:11 Blue:25
Column 17,
    Red:25 Green:19 Blue:10
Column 18,
    Red:15 Green:26 Blue:19
Column 19,
    Red:8 Green:13 Blue:23
Column 20,
    Red:2 Green:11 Blue:18
Row 7
Column 1,
    Red:25 Green:4 Blue:15

Column 2,
  Red:26 Green:12 Blue:31
Column 3,
  Red:29 Green:20 Blue:4
Column 4,
  Red:21 Green:7 Blue:21
Column 5,
  Red:25 Green:13 Blue:15
Column 6,
  Red:2 Green:23 Blue:27
Column 7,
  Red:1 Green:27 Blue:27
Column 8,
  Red:8 Green:28 Blue:6
Column 9,
  Red:17 Green:27 Blue:17
Column 10,
  Red:3 Green:5 Blue:2
Column 11,
  Red:24 Green:29 Blue:11
Column 12,
  Red:20 Green:12 Blue:26
Column 13,
  Red:2 Green:7 Blue:17
Column 14,
  Red:27 Green:17 Blue:3
Column 15,
  Red:5 Green:2 Blue:24
Column 16,
  Red:27 Green:5 Blue:20
Column 17,
  Red:12 Green:20 Blue:6
Column 18,
  Red:7 Green:17 Blue:27
Column 19,
  Red:17 Green:3 Blue:18
Column 20,
  Red:10 Green:23 Blue:26
Row 8
Column 1,
  Red:9 Green:12 Blue:14
Column 2,
  Red:23 Green:30 Blue:7
Column 3,
  Red:17 Green:27 Blue:17
Column 4,
  Red:3 Green:26 Blue:2
Column 5,
  Red:24 Green:27 Blue:7
Column 6,
  Red:20 Green:13 Blue:19
Column 7,
  Red:14 Green:7 Blue:17
Column 8,
  Red:27 Green:17 Blue:3
Column 9,
  Red:9 Green:22 Blue:29
Column 10,
  Red:23 Green:2 Blue:8
Column 11,
  Red:30 Green:26 Blue:4
Column 12,
  Red:5 Green:20 Blue:20
Column 13,
  Red:15 Green:26 Blue:13
Column 14,
  Red:20 Green:29 Blue:21
Column 15,
  Red:1 Green:11 Blue:4
Column 16,
  Red:11 Green:1 Blue:22
Column 17,
  Red:19 Green:28 Blue:7
Column 18,
  Red:29 Green:21 Blue:8
Column 19,
  Red:16 Green:17 Blue:13
Column 20,
  Red:15 Green:27 Blue:6
Row 9
Column 1,
  Red:20 Green:14 Blue:19
Column 2,
  Red:20 Green:3 Blue:9
Column 3,
  Red:14 Green:9 Blue:2
Column 4,
  Red:17 Green:27 Blue:17
Column 5,
  Red:3 Green:10 Blue:27
Column 6,
  Red:14 Green:25 Blue:12
Column 7,
  Red:8 Green:30 Blue:1
Column 8,
  Red:26 Green:29 Blue:21
Column 9,
  Red:12 Green:7 Blue:28
Column 10,
  Red:5 Green:20 Blue:6
Column 11,
  Red:17 Green:15 Blue:23
Column 12,
  Red:29 Green:16 Blue:24
Column 13,
  Red:15 Green:25 Blue:2
Column 14,
  Red:3 Green:14 Blue:13
Column 15,
  Red:2 Green:21 Blue:9
Column 16,
  Red:12 Green:16 Blue:25
Column 17,
  Red:13 Green:8 Blue:14
Column 18,
  Red:27 Green:20 Blue:8
Column 19,
  Red:9 Green:2 Blue:15
Column 20,
  Red:31 Green:26 Blue:12
Row 10
Column 1,
  Red:24 Green:29 Blue:2
Column 2,
  Red:28 Green:30 Blue:18
Column 3,
  Red:12 Green:7 Blue:9
Column 4,
  Red:5 Green:8 Blue:13
Column 5,
  Red:27 Green:4 Blue:23
Column 6,
  Red:15 Green:1 Blue:22
Column 7,
  Red:2 Green:6 Blue:9
Column 8, Red:28 Green:13 Blue:22
Column 9,
  Red:26 Green:23 Blue:28
Column 10,
  Red:19 Green:12 Blue:13
Column 11,
  Red:19 Green:2 Blue:21
Column 12,
  Red:7 Green:21 Blue:1
Column 13,
  Red:13 Green:19 Blue:30
Column 14,
  Red:6 Green:25 Blue:11
Column 15,
  Red:28 Green:12 Blue:26
Column 16,
  Red:6 Green:7 Blue:17
Column 17,
  Red:27 Green:17 Blue:3
Column 18,
  Red:23 Green:30 Blue:7
Column 19,
  Red:17 Green:27 Blue:17
Column 20,
  Red:3 Green:17 Blue:14
Row 11
Column 1,
  Red:23 Green:24 Blue:1
Column 2,
  Red:12 Green:14 Blue:16
Column 3,
  Red:6 Green:24 Blue:25
Column 4,
  Red:1 Green:11 Blue:4
Column 5,
  Red:11 Green:1 Blue:7
Column 6,
  Red:17 Green:27 Blue:17
Column 7,
  Red:3 Green:20 Blue:2
Column 8,
  Red:21 Green:7 Blue:21
Column 9,
End of list

APPLICATIONS

As a further example of small label application, an article of expensive jewelry bearing a miniature color coded array label in an unobtrusive place, can be read by a customs official to provide legally required information: can be read by the shipper to provide information of shipping interest; can be read by a retailer to provide sales information; or can be read by the owner for ownership and disposition information.

In one embodiment usable for the sight and sound industry, each color coded array is small, for instance, ½"×½". The high density of information in this area stores serial numbers, lot numbers, where and when made, how distributed (if known at time of printing of the array), artistic content (name, title, group, participants, staff, instruments, technical recording details, etc.), legal details (assignees or owners, list pricing, addresses, phone numbers, special contract clauses, etc.), customs information, etc.

In brief the color coded array system provides a unique, data rich fingerprint for each unit of product, that could never have been printed by present coding techniques because of lack of space.

This color coded array is read by special Readers, typically operated in the sight and sound industry by commercial distributors, customs officials, or policing agents.

All data can be read such that it can tie into computerized management information system, materials review process, point of sale system or any Stock Management technique being used.

For protecting data storage, software programs, computer games and the like, each color coded array can also contain a unique Key or number to be entered into the key pad on the playback unit by the operator. Without this Key the playback unit may not be able to play the recording, which has embedded in it the matching lock. The key would be made available to the owner at time of purchase by reading the color coded array. A counterfeiter or pirate would have to have the means to eliminate this security lock and key during a copying operation, or duplicate the Patented technology. The protection is not in the existence of the deciphering key, but in the very fact the material is encrypted, with the key being unique to each record.

Generally, marking and labelling are subsets of Information Storage. The current marking industry is fragmented and based on both Central Information Storage (CIS), and Distributed Information (DI). CIS is based on a range of technologies including, but not limited to, white/black bar codes [e.g. the Universal Product Code (UPC)], magnetic strips, and as yet in a small way, holography. DI is currently based on etched numerics, stamping, ink jet, digital optical storage [e.g. Compact Diskettes (CDs)], magnetic media (e.g. tapes, disks, diskettes), direct printing, and indirect imprinting using labels using human readable language and symbols. As a result there appear to exist many potential competitors to the subject invention.

However, matrices of colored regions as taught in this patent serve a different function. The array of colored regions information storage technology when implemented on labels provides high density product information on site where a tie-in to a central data processor is not necessary. Thus, the herein taught technology of storage of information in arrays of colored regions is spearheading compact Distributed Information Storage (DIS). The typical CIS case is UPCs, as these serve the task of enabling inventory management and Point of Sale transaction management, all tied to centrally controlled Finance and Procurement administration. In essence, barcodes provide a file number, a "gateway" to the centralized data base.

Separate and distinct, arrays or matrices of colored regions provide the means for an effective Distributed Information Structure (DIS), eminently computerized. The colored regions array system codes information and will store large quantities of coded data in a minute area; code data in very high density format (for example, ultimately over 12,000 pages or more of data encoded on a topography of less than one square inch); utilize labels engineered to be able to withstand the most demanding of manufacturing and storage environments; and will utilize labels readable even at the end of the labelled product's life cycle.

Importantly, the system thus will have labels decoded using a self-contained, potentially portable reading system which eliminates the need for data storage and retrieval from a central computer, yet retains the speed and versatility of microcomputers as data retrieval/data processing tools; and will be moderately priced relative to other coding systems, making the technology affordable and therefore available to a broad market base.

As examples of market niches there are entertainment Sound and Sight media protection against losses from piracy and counterfeiting; medical industry protection against losses from piracy and counterfeiting of drugs, as well as assurance of quality reporting; protection against losses from piracy and counterfeiting of copyrighted and proprietary software programs; archival, condensing, and security of all information, be it books, magazines, newspapers, data, documentation, images, alphanumerics, entertainment recordings, professional knowledge, governmental data, in brief, any and all information transmutable into computer storable format. In summary the subject technique applies to any item of information can be reduced by known means to bit streams. This means that documents, graphics, sound, technical data, or any other elements of information can be translated into an array of bits or streams of 1s and 0s, using any number of computer input devices such as keyboards, scanners, etc. This bit stream may now be secured by encrypting using an Encryption Algorithm. The result is another bit stream. If encryption is not desired, it may be omitted. The resultant bit stream is translated by the array of colored regions algorithms into instructions that in turn actuate a special Printer (or Writer) to output hard copy, bearing the colored regions arrays that bear the information.

With respect to labelling of electronic devices and components, the electronics market consists of two categories: First, where the matrices of colored regions can be produced using existing or available film technologies, such as labels for shipping packages of ICs and other electronic components; and secondly marking/labelling the electronic components themselves.

Manufacturers of Packaged Integrated Circuits (PIC's) have severe problems in securing their products against counterfeiting. There are instances of illicit PIC's coming to market, which the industry would like to guard against. Often, these are tolerance fall-outs which are marked as tight tolerance devices by unscrupulous distributors. Manufacturers would benefit from a secure validation mark.

Labels to be applied on the PICs and other components preferably cover the whole device area. Most of the area contains human legible markings, such as logos and part numbers. A small area approximately 1 to 4 square millimeters in size is dedicated to miniature matrices of colored regions. Such matrices of colored regions can be read by a customs official to provide legally required information, by the engineers to obtain detailed technical information, by the assembler for selection of associated components, by field service for replacement instructions and alternative devices, and by Quality Control (QC) for device original quality level. Each uses a different 'read' algorithm to extract only the relevant information. It also makes the device difficult or impossible to counterfeit.

This application of the subject technology allows for storage of a particular devices's production and characterization history to be encoded on the device label. The information derived from the QC probing and testing operations is encoded and printed. Once applied to the packaged IC, it is readable using a special reader. On reading, a specific algorithm decodes the information and displays it on a screen or to another appropriate computer peripheral, including to the Printed Circuit Board (PCB) assembly machine resident intelligence.

When read by either a 'smart' assembly machine or by a terminal accessed by a human operator, this information can then be used for precise matching of associated components at assembly. High density information storage matrices of colored regions are directly suitable in high-reliability applications, aerospace, communications, fault-tolerant computers, medical applications, etc., wherever device specific histories must be maintained.

There are instances in the IC industry where individual devices have individual properties. In particular, this occurs with programmable and some custom gate array devices. Here, the high data density of the colored regions arrays enables that data to be present on the device itself. Thus, labels including high density information storage matrices of colored regions provide both on-site data as well as validation.

A partial listing of applications is as follows:

Labelling of mechanical devices and components; labelling of all items requiring traceability; condensing of documents and individual security (Identity Cards, passports, etc.) and action elements (travel tickets, medical instructions, wills, Smart Cards, etc.) into small 'label' sized areas; condensing of books, magazines, and newspapers into pocket card size including drawings, Braille script and information, sound, speech, images in two-space dimensions ('stills', paintings, etc.), images in three space dimensions (holograms), images in two and three space dimensions and one of time (movies both flat screen and holographic), and information in any other number of dimensions, or associated with sensory apparatus other than sight and sound such as smell and taste (chemical), thermal phenomena, electromagnetic phenomena, or phenomena not sensible to unaided living senses (e.g. gathered by instrumentation).

All that is needed is the ability to encode the information in bit stream format. The bit stream format is thereafter reconfigured into color coded dot arrays on hard copy. The hard copy will then contain all the information previously available in its original format and with appropriate apparatus can be reconfigured to that original format.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A method for machine-reading data encoded on a medium having a number of regions, each region having a spot with one of a plurality of hues and one of a plurality of intensity levels, wherein the number of regions includes data regions and reference regions, the reference regions having respective predetermined reference hue and respective predetermined reference intensity, the method comprising the steps of:

determining the hues and the intensity levels of the data regions;

determining the hues and the intensity levels of the reference regions;

comparing the determined hues and intensity levels of the reference regions with the corresponding predetermined reference hues and the predetermined reference intensity levels;

determining an error factor based at least in part on the difference between the determined hue and intensity of at least one reference region and the predetermined reference hue and predetermined reference intensity of at least one reference region; and applying a correction factor to the determined hue and intensity of at least one data region to obtain an adjusted hue and/or an adjusted intensity, wherein the correction factor is derived at least in part from the error factor.

2. The method of claim 1, wherein the steps of determining include illuminating the data regions and the reference regions, and providing a color filter for filtering light.

3. The method of claim 2, wherein the steps of determining further include receiving filtered light with a detector which provides an output signal indicating the intensity of the filtered light.

4. The method of claim 1, wherein the step of determining comprises successively illuminating the regions with a plurality of light sources having a plurality of different colors 5. The method of claim 4 wherein the step of determining further comprises receiving the light from the illuminated regions with a monochrome solid state camera.

6. The method of claim 1, wherein the medium has many regions, and wherein the number of data regions is much larger than the number of reference regions.

7. The method of claim 1, wherein a table relates hues and intensities with corresponding pieces of information, the method further comprising the steps of using the adjusted hue and/or adjusted intensity to access the table to obtain the piece of information corresponding to the adjusted hue and/or the adjusted intensity.

8. The method of claim 1 further comprising utilizing an algorithm which converts the adjusted hue and/or intensity level of the data regions to pieces of information.

9. The method of claim 1 wherein the piece of information includes data relating to one of the group consisting of alphanumeric characters, pictures, sounds, and bitstreams.

10. The method of claim 1 wherein the reference regions are positioned adjacent data regions at predefined locations in the medium.

11. The method of claim 1 wherein there are at least one hue and at least three different intensity levels.

12. The method of claim 11 wherein there are at least four different intensity levels.

13. An apparatus for machine-reading colored regions on a medium, the regions each having one of a plurality of hues and one of a plurality of intensity levels, the regions including data regions and reference regions, the machine comprising:

means for detecting the hue and the intensity level of the data regions and the reference regions;

means for changing the detected hue and intensity level for at least one data region in response to the detected hue and intensity level of at least one reference region;

means for converting changed detected data region hues and intensity levels to corresponding pieces of information; and means for providing an output signal indicating the corresponding piece of information.

14. The apparatus of claim 13 wherein the means for detecting includes;

an illumination source for directing light to the region resulting in reflected light;

a color filter for receiving light and providing filtered light; and a detector for receiving filtered light and for providing an output signal indicating the intensity of the filtered light detected by the detector.

15. The apparatus of claim 13 wherein the changing means includes: memory for storing predefined hues and intensity levels for the reference regions; means for comparing the detected hues and intensity levels of the reference region and the predefined hues and intensity levels and for providing an error signal based on the comparison; and means for adjusting the detected hues and intensity levels of the data regions in response to the error signal.

16. The apparatus of claim 13 wherein the medium has a plurality of layers in which at least some regions have different color and/or intensity from an overlying region.

17. The apparatus of claim 13 wherein the means for converting includes a look-up table having entries for hues and intensities, and corresponding entries for pieces of information.

18. The apparatus of claim 13 wherein the means for converting includes a software algorithm.

19. The apparatus of claim 13 wherein the means for detecting includes a plurality of light sources having different colors, and means for successively illuminating regions with each of the plurality of light sources.

20. The apparatus of claim 19 further comprising a monochrome solid state camera for receiving light resulting from the successive illumination.

* * * * *